United States Patent
Song

(10) Patent No.: US 9,930,240 B2
(45) Date of Patent: Mar. 27, 2018

(54) METHOD AND APPARATUS FOR CONTROLLING A CAMERA BY USING BLUETOOTH COMMUNICATION IN A WIRELESS COMMUNICATION SYSTEM

(71) Applicant: LG ELECTRONICS INC., Seoul (KR)

(72) Inventor: Jonghun Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 81 days.

(21) Appl. No.: 14/974,819

(22) Filed: Dec. 18, 2015

(65) Prior Publication Data

US 2016/0182803 A1    Jun. 23, 2016

Related U.S. Application Data

(60) Provisional application No. 62/095,063, filed on Dec. 22, 2014.

(51) Int. Cl.
*H04N 5/232* (2006.01)
*H04N 1/00* (2006.01)

(52) U.S. Cl.
CPC ..... *H04N 5/23206* (2013.01); *H04N 1/00209* (2013.01)

(58) Field of Classification Search
CPC .................. H04N 5/23206; H04N 5/23216
See application file for complete search history.

(56) References Cited

U.S. PATENT DOCUMENTS

| | | | | |
|---|---|---|---|---|
| 6,809,759 B1* | 10/2004 | Chiang | ............. | H04N 5/23293 348/211.2 |
| 9,716,969 B2* | 7/2017 | Song | ............. | H04W 4/008 |
| 2008/0158336 A1* | 7/2008 | Benson | ............. | H04L 65/602 348/14.08 |
| 2008/0298571 A1* | 12/2008 | Kurtz | ............. | H04N 7/142 379/156 |
| 2013/0127602 A1* | 5/2013 | Jantunen | ............. | H04W 52/0274 340/10.51 |
| 2013/0246641 A1* | 9/2013 | Vimpari | ............. | H04L 47/10 709/228 |
| 2014/0267931 A1* | 9/2014 | Gilson | ............. | H04N 5/4403 348/734 |
| 2015/0077548 A1* | 3/2015 | Meredith | ............. | H04W 4/22 348/143 |
| 2015/0103235 A1* | 4/2015 | Yoshizawa | ............. | H04N 5/23241 348/372 |
| 2015/0109437 A1* | 4/2015 | Yang | ............. | H04N 5/23206 348/143 |

(Continued)

*Primary Examiner* — Antoinette Spinks
(74) *Attorney, Agent, or Firm* — Birch, Stewart, Kolasch & Birch, LLP

(57) ABSTRACT

In a method for controlling a camera by using Bluetooth communication in a wireless communication system, a method performed by a first device comprises transmitting to the camera a command message including camera control information for controlling a specific function of the camera; transmitting to the camera a configuration message for setting a trigger point of the camera, where the trigger point is a condition by which specific information is received from the camera; and receiving a notification message including the specific information from the camera.

8 Claims, 18 Drawing Sheets

(56) References Cited

U.S. PATENT DOCUMENTS

| | | | |
|---|---|---|---|
| 2015/0264322 A1* | 9/2015 | Ang | H04N 5/2251 348/143 |
| 2016/0036854 A1* | 2/2016 | Himawan | H04L 63/20 726/5 |
| 2016/0065831 A1* | 3/2016 | Howard | H04N 5/23206 348/211.2 |
| 2016/0080896 A1* | 3/2016 | Song | H04W 4/008 455/41.2 |
| 2016/0241726 A1* | 8/2016 | Okamura | H04N 1/00307 |
| 2016/0359925 A1* | 12/2016 | Song | H04L 65/1069 |
| 2017/0223579 A1* | 8/2017 | Lee | H04W 28/16 |

* cited by examiner

METHOD AND APPARATUS FOR CONTROLLING A CAMERA BY USING BLUETOOTH COMMUNICATION IN A WIRELESS COMMUNICATION SYSTEM

CROSS-REFERENCE TO RELATED APPLICATIONS

This application claims priority to Provisional Application No. 62/095,063 filed on 22 Dec. 2014 in US the entire contents of which is hereby incorporated by reference in its entirety.

BACKGROUND OF THE INVENTION

Field of the Invention

The present invention is related to a wireless communication system supporting Bluetooth communication and more specifically, a method and an apparatus for controlling a camera by using Bluetooth communication.

Discussion of the Related Art

Bluetooth is one of typical short range wireless technologies for exchanging information among various devices such as smart phones, PCs, earphones, and headphones. Bluetooth technology is now adopted by most of smart phones, PCs, and notebooks; and is widely used for the convenience of use. The easy pairing process of Bluetooth technology provides reliable connectivity among different devices. A recent Bluetooth variant LE is capable of providing hundreds of kilobytes of information reliably while requiring considerably reduced power consumption.

The Bluetooth Core Specification comprises BR/EDR (Basic Rate/Enhanced Data Rate) and LE (Low Energy) version.

Of the two versions, Bluetooth Low Energy (in what follows, it is called 'BLE') is a subset of Bluetooth Specification v4.0, aimed for high energy efficiency compared with the former Bluetooth specifications.

As Bluetooth technology is increasingly adopted for controlling devices on Wireless Personal Area Networks (WPANs), a camera control technology based on Bluetooth is also being widely used. The smart phone function for controlling a digital camera is one of typical examples.

However, current camera control technologies are unilateral, providing only the camera control function (such as still image picture, video recording start & stop, and pan/tilt/zoom control), and there is no other way for a camera to send information to a smartphone.

SUMMARY OF THE INVENTION

The present invention has been made to provide a method for avoiding unilateral control of a camera and giving a device an intelligence function by adding bilateral control.

Also, the present invention has been made to provide a notification service from a camera to a smart device for taking into account IoT enabling technology aspect and providing an intelligence function of a Bluetooth device.

Technical objects of the present invention are not limited to those objects described above; other technical objects not mentioned above can be clearly understood from the description below by those skilled in the art to which the present invention belongs.

In a method for controlling a camera by using Bluetooth communication in a wireless communication system, a method performed by a first device according to the present invention comprises transmitting to the camera a command message including camera control information for controlling a specific function of the camera; transmitting to the camera a configuration message for setting a trigger point of the camera, where the trigger point is a condition by which specific information is received from the camera; and receiving a notification message including the specific information from the camera.

The trigger point of the present invention includes a memory alarm threshold representing a threshold value indicating that the camera memory is near full.

The method according to the present invention further comprises receiving from the camera a contents move start message indicating start of movement of contents of the camera; and receiving contents of the camera through first communication from the camera.

The method according to the present invention further comprises receiving from the camera a contents move end message indicating end of movement of contents of the camera.

The camera control information according to the present invention includes surveillance mode information representing a surveillance feature supported by the camera.

The specific information according to the present invention further comprises security alert notification information, and the security alert notification information includes camera number information corresponding to a camera which has caused a security alert.

The method according to the present invention further comprises forwarding the specific information to a second device; receiving from the second device an image capture message commanding a camera corresponding to the camera number information to capture an image related to a security alert notification; forwarding the received image capture message to a camera corresponding to the camera number information; receiving an image from the camera corresponding to the camera number information; and transmitting the received image to the second device.

The method according to the present invention further comprises receiving an advertising message from the camera to perform camera control, where the advertising message includes at least one of the camera-related information or connection information related to the camera connection; and transmitting a connection request message for establishing a Bluetooth connection to the camera.

The camera according to the present invention refers to a plurality of cameras, and the method according to the present invention further comprises establishing a Bluetooth connection to the plurality of cameras simultaneously; and transmitting an empty packet to each camera to check the Bluetooth connection.

The method according to the present invention further comprises transmitting and receiving data to and from the plurality of cameras respectively by using different data channels simultaneously.

In a first device for controlling a camera by using Bluetooth communication in a wireless communication system, a device according to the present invention comprises a communication unit configured to communicate with the outside in a wireless or wired manner; and a processor configured to be functionally connected to the communication unit, where the processor is configured to transmit to the camera a command message including camera control information for controlling a specific function of the camera; to transmit to the camera a configuration message for setting a trigger point of the camera, where the trigger point is a condition by which specific information is received from the camera; and to receive a notification message including the specific information from the camera.

The Advantageous Effects of the Invention

The present invention gives various kinds of camera products intelligence on the basis of bilateral control such as a notification service, thereby enabling the camera products to provide various services as IoT end terminals.

Also, the present invention is capable of automatically transmitting to a smartphone or a cloud (server) image data (photos/video clips) obtained by a camera for various purposes.

As one example, a smartphone is automatically informed of the remaining battery of a battery-operated camera, and at the time of a predetermined event (such as low battery, memory full, and surveillance alert detection), image data can be automatically transmitted to a WI-Fi position pre-stored in the camera.

Advantageous effects that can be obtained by applying the present invention are not limited to the aforementioned effects, and other advantageous effects not mentioned above can be clearly understood from the description below by those skilled in the art to which the present invention belongs.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
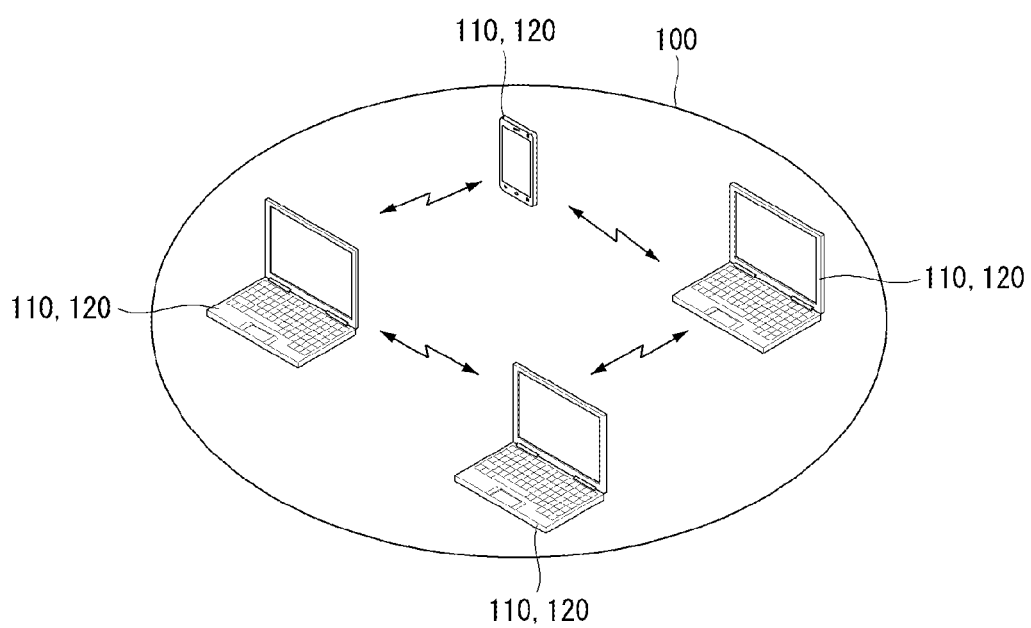
FIG. 1 illustrates one example of a wireless communication system using a Bluetooth low energy technology to which a method according to the present invention can be applied.

In what follows, the present invention will be described in more detail with reference to appended drawings.

A suffix such as "module" and "unit" introduced in the description below is assigned merely to facilitate description of this document, and the "module" and "unit" can be used interchangeably.

Meanwhile, a device according to this document refers to a device capable of wireless communication, including a mobile phone including a smartphone, tablet PC, desktop computer, notebook, and television including a smart TV and IPTV.

In what follows, embodiments of the present invention will be described in detail with reference to appended drawings and descriptions contained in the drawings, but the technical scope of the present invention is not restricted by the embodiments or limited to the embodiments.

Wherever possible, general terms widely used by the public have been chosen as long as the terms do not obscure their technical functions intended in the present invention; however, those terms can be changed by the intention of those skilled in the art, practices, or advent of a new technology.

In some case, specific terms are chosen arbitrarily; in that case, specific meaning of the corresponding terms will be elaborated at the corresponding description.

Therefore, the terms used in this document should be interpreted on the basis of their actual meaning and the description throughout the document rather than the immediate names of the terms.

FIG. 1 illustrates one example of a wireless communication system using a Bluetooth low energy technology to which a method according to the present invention can be applied.

The wireless communication system 1 comprises at least one server device 110 and at least one client device 120.

The server device and the client device perform Bluetooth communication by using Bluetooth Low Energy (in what follows, it is denoted as BLE for the purpose of convenience) technology.

First of all, compared with Bluetooth BR/EDR (Basic Rate/Enhanced Data Rate) technology, BLE technology requires a relatively small duty cycle. Products based on BLE technology can be manufactured at low costs and require considerably small power consumption through low speed data transmission rate; therefore, they can be operated more than one year with a coin cell battery.

Also, BLE technology simplifies a connection procedure between devices and requires a smaller packet size than Bluetooth BR/EDR technology.

Features of BLE technology can be summarized as follows: (1) the number of RF channels is 40, (2) the data transmission speed of 1 Mbps is supported, (3) star topology is used, (4) latency is 3 ms, (5) the maximum current is less than 15 mA, (6) the output power is less than 10 mW (10 dBm), and (7) main application fields include mobile phones, watch, sports, health-care, sensor, and device control.

The server device 110 can operate as a client device in a relationship with a different device, and similarly the client device can operate as a server device in a relationship with a different device. In other words, in the BLE communication system, a device can operate as a server device or a client device, and if needed, a device can operate as a server device and a client device at the same time.

The server device 110 can be called a data service device, master device, master, server, conductor, host device, audio source device, or first device. The client device can be called a slave device, slave, client, member, sink device, audio sink device, or second device.

The server device and the client device constitute a main part of the wireless communication system, and the wireless communication system can include other constituting elements in addition to the server device and the client device.

The server device refers to a device which receives data from a client, performs communication directly with the client device, and if receiving a data request from the client device, provides data to the client device through a response.

Also, the server device sends a notification message and indication message to the client device to provide data information to the client device. Also, when transmitting an indication message to the client device, the server device receives a confirm message corresponding to the indication message from the client device.

Also, the server device can provide data information to the user through a display unit or receive a request input from the user through a user input interface while transmitting and receiving a notification, indication, and confirm message to and from the client device.

Also, the server device can read data from a memory unit or write new data to the corresponding memory while transmitting and receiving a message to and from the client device.

Also, one server device can be connected to a plurality of client devices and can be easily re-connected to client devices by using bonding information.

The client device 120 refers to a device which requests data information and data transmission from a server device.

The client device receives data from the server device through a notification message and indication message and when receiving an indication message from the server device, sends a confirm message in response to the indication message.

In the same way as the server device, the client device can provide information to the user through a display unit or receive an input from the user through a user input interface while transmitting and receiving message to and from the server device.

Also, the client device can read data from a memory unit or write new data to the corresponding memory while transmitting and receiving a message to and from the server device.

Hardware components such as a display unit, user input interface, and memory unit of the server device and the client device will be described in detail with reference to FIG. 2.

Also, the wireless communication system can form a Personal Area Network (PAN) by using Bluetooth technology. As one example, the wireless communication system can exchange files and documents in a prompt and safe manner by forming a private piconet among devices.

A BLE device can operate to support various Bluetooth-related protocols, profiles, and processes.

Figure 2:
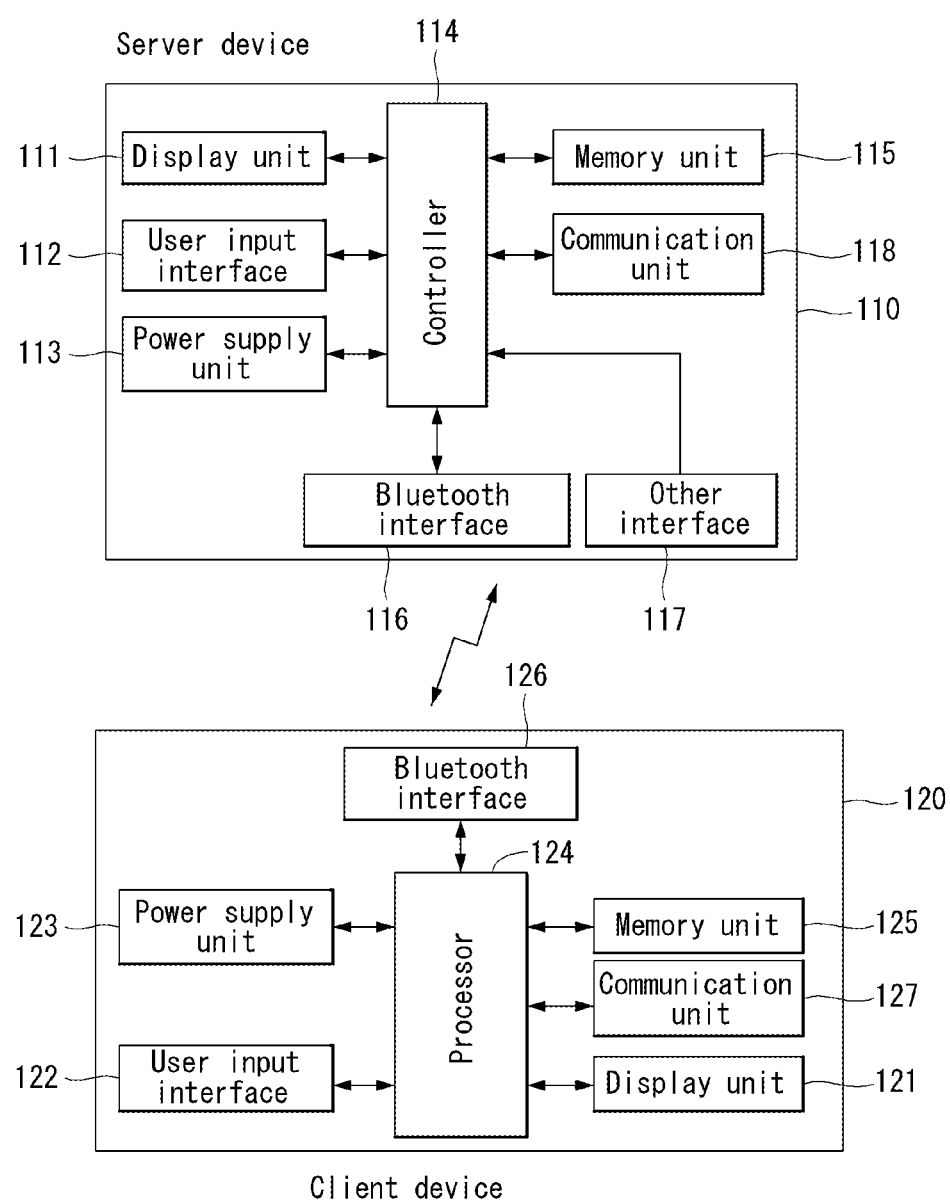
FIG. 2 illustrates one example of an internal block diagram of a server device and a client device capable of implementing methods of the present invention.

FIG. 2 illustrates one example of an internal block diagram of a server device and a client device capable of implementing methods of the present invention.

A server device can be connected to at least one client device.

Also, depending on the needs, the internal block diagram of each device may further include other constituting elements (modules, blocks, or units), and part of the constituting elements of FIG. 2 may be omitted.

As shown in FIG. 2, a server device comprises a display unit 111, a user input interface 112, a power supply unit 113, a processor 114, a memory unit 115, a Bluetooth interface 116, other interface 117, and a communication unit (or transmitting and receiving unit) 118.

The display unit 111, user input interface 112, power supply unit 113, processor 114, memory unit 115, Bluetooth interface 116, other interface 117, and communication unit 118 are functionally connected to each other to perform a method of the present invention.

Also, a client device comprises a display unit 121, a user input interface 122, a power supply unit 123, a processor 124, a memory unit 125, a Bluetooth interface 126, and a communication unit (or transmitting and receiving unit) 127.

The display unit 121, user input interface 122, power supply unit 123, processor 124, memory unit 125, Bluetooth interface 126, and communication unit 127 are functionally connected to each other to perform a method of the present invention.

The Bluetooth interface 116, 126 refers to a unit (or module) capable of transmitting a request/response, command, notification, indication/confirm message, or data between devices by using Bluetooth technology.

The memory 115, 125 is a unit implemented in various types of devices and refers to a unit to which various types of data are stored.

The processor 114, 124 refers to a module controlling the overall operation of the server device or the client device; and controls the server device or the client device to request transmission of a message through the Bluetooth interface or other interface and to process a received message.

The processor 114, 124 can be represented by a controller or a control unit.

The processor 114, 124 can include Application-Specific Integrated Circuit (ASIC), other chipsets, logical circuit and/or data processing device.

The memory 115, 125 can include ROM (Read-Only Memory), RAM (Random Access Memory), flash memory, memory card, storage medium and/or other storage device.

The communication unit 118, 127 can include baseband circuit for processing a radio signal. In case an embodiment is implemented in the form of software, the method described above can be implemented by a module (process or function) which performs the function described above. A module is stored in the memory and is carried out by the processor.

The memory 115, 125 can be installed inside or outside the processor 114, 124 and can be connected to the processor 114, 124 through various well-known means.

The display unit 111, 121 refers to the module for providing status information of a device and message exchange information to the user through a display.

The power supply unit 113, 123 refers to the module receiving external or internal power under the control of the controller and supplying power required for the operation of each individual element.

As described above, BLE technology is characterized by a small duty cycle and considerably reduces power consumption through a low data transmission rate; therefore, BLE technology is capable of supplying power required for the operation of each individual element even with small output power (which is less than 10 mW (10 dBm)).

The user input interface 112, 122 refers to the module which provides a user input such as a display button to the controller so that the user can control the operation of a device.

Figure 3:
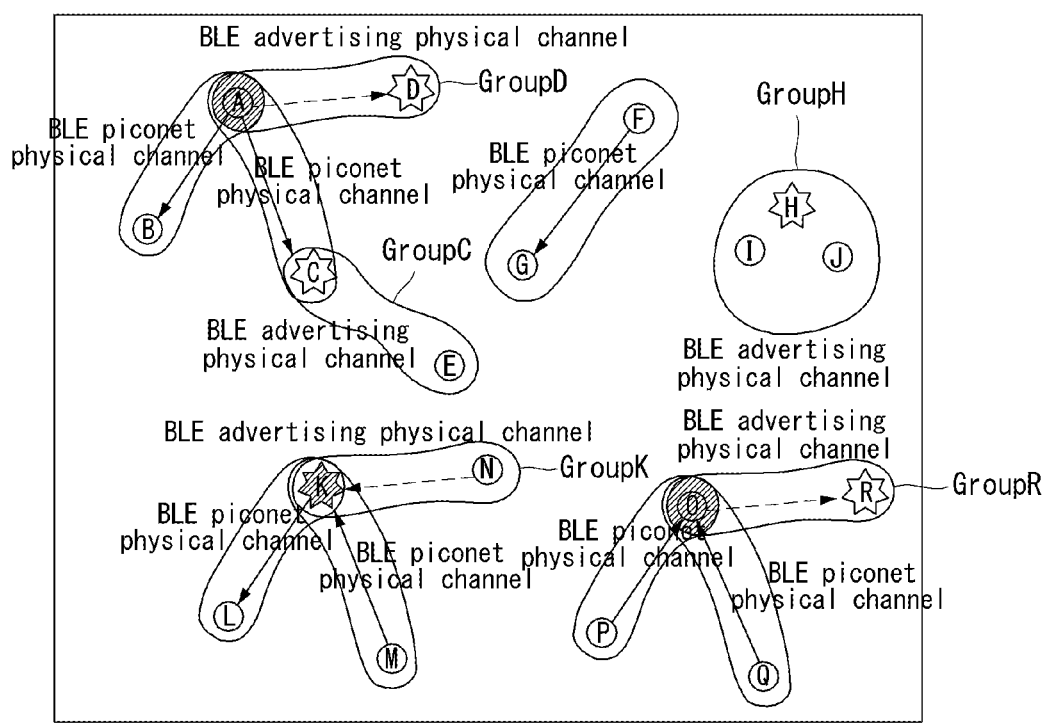
FIG. 3 illustrates one example of a Bluetooth low energy network topology.

FIG. 3 illustrates one example of a Bluetooth low energy network topology.

With reference to FIG. 3, a device A corresponds to a piconet (piconet A, the shaded area) master having a device B and a device C as slaves.

At this time, a piconet refers to a set of devices where one from among a plurality of devices acts as a master and the others occupy a shared physical channel connected to the master device.

A BLE slave does not share the common physical channel with the master. Each slave communicates with the master through a separate physical channel. There is another piconet (piconet F) which consists of a master device F and a slave device G.

A device K belongs to a scatternet K. At this time, a scatternet refers to a group of piconets interconnected to each other.

A device K is a master of a device L and at the same time, a slave of a device M.

A device O also belongs to a scatternet O. The device O is a slave of a device P and at the same time, a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In group D, the device D advertises by using an advertisement event which can be connected on an advertising physical channel, and the device A is an initiator. The device A can establish a connection to the device D and add a device to the piconet A.

In group C, the device C advertises on an advertising physical channel by using a certain type of an advertisement event captured by the scanner device E.

The group D and the group C can utilize different advertising physical channels or different time frames to avoid collision.

The piconet F has one physical channel. The device F and the device G use one BLE piconet physical channel. The device F is a master, and the device G is a slave.

The group H has one physical channel. The device H, I, and J use one BLE advertising physical channel. The device H is an advertiser, and the device I and J are scanners.

In the scatternet K, the device K and L use one BLE piconet physical channel. The device K and M use another BLE piconet physical channel.

In group K, the device K advertises by using an advertisement event which can be connected to an advertising physical channel, and the device N is an initiator. The device N can establish a connection with the device K. At this time, the device K acts as a slave of two devices, and at the same time, a master of one device.

In the scatternet O, the device O and P use one BLE piconet physical channel. The device O and Q use another BLE piconet physical channel.

In group R, the device R advertises by using an advertisement event which can be connected to an advertising physical channel, and the device O is an initiator. The device O can establish a connection with the device R. At this time, the device O acts as a slave of two devices, and at the same time, a master of one device.

Figure 4:
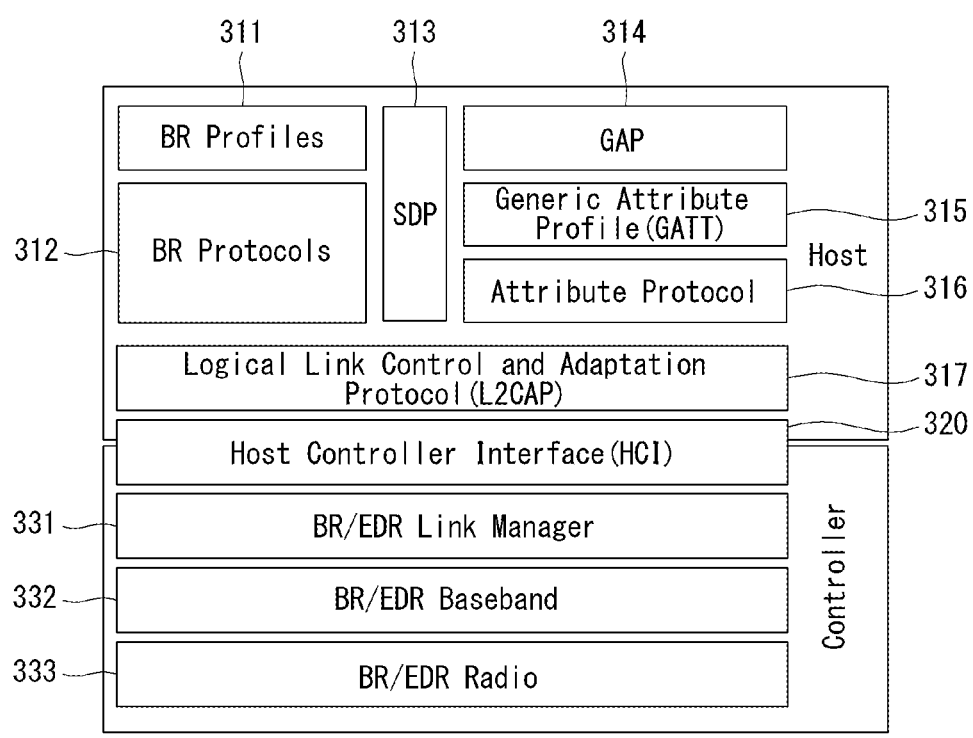
FIGS. 4 and 5 illustrate one example of Bluetooth communication architecture to which methods according to the present invention can be applied.
Figure 5:
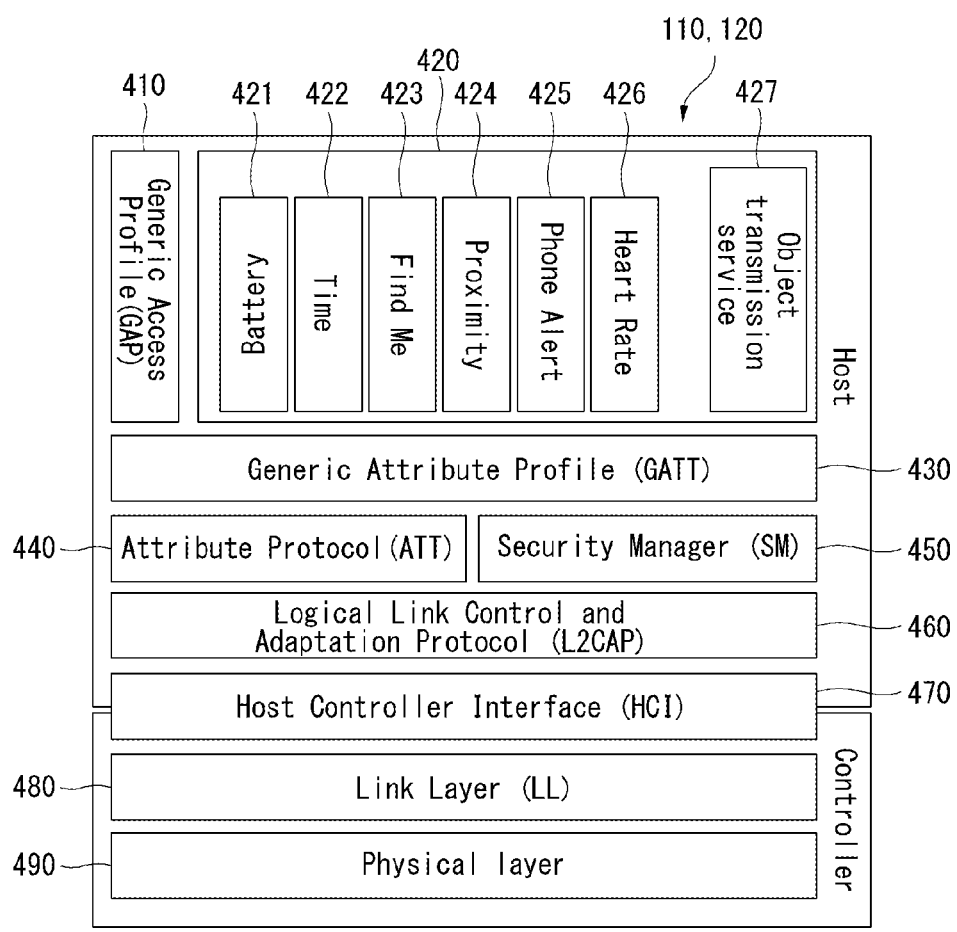

FIGS. 4 and 5 illustrate one example of Bluetooth communication architecture to which methods according to the present invention can be applied.

More specifically, FIG. 4 illustrates one example of Bluetooth BR (Basic Rate)/EDR (Enhanced Data Rate), and FIG. 5 illustrates one example of Bluetooth LE (Low Energy) architecture.

First, as shown in FIG. 4, Bluetooth BR/EDR architecture comprises a controller stack 410, HCI (Host Controller Interface) 420, and a host stack 430.

The controller stack (or controller module, 410) refers to the hardware for transmitting or receiving Bluetooth packets to and from a wireless transmission and reception module dealing with Bluetooth signals of 2.4 GHz; and comprises a BR/EDR Radio layer 411, BR/EDR Baseband layer 412, and BR/EDR Link Manager layer 413.

The BR/EDR Radio layer 411 transmits and receives a radio signal of 2.4 GHz and is capable of transmitting data by hopping 79 RF channels when Gaussian Frequency Shift Keying (GFSK) modulation is employed.

The BR/EDR baseband layer 412 transmits a digital signal, selects a channel sequence which performs hopping 1600 times per second, and transmits a time slot spanning 625 us for each channel.

The link manager layer 413 controls the overall operation of a Bluetooth connection such as link setup, control, and security by using Link Manager Protocol (LMP).

The link manager layer can perform the following functions.

- Control of ACL/SCO logical transport and logical link setup
- Detach: removes a connection and informs the corresponding device of the cause of the removal.
- Performs power control and role switch
- Performs a security function such as authentication, pairing, and encryption.

The host controller interface layer 420 provides an interface between a host module 430 and a controller module 410 so that a host can provide a command and data to a controller and the controller can provide an event and data to the host.

The host stack (or host module) 430 comprises L2CAP 437, Service Discovery Protocol (SDP) 433, BR/EDR protocol 432, BR/EDR profiles 431, Attribute Protocol 436, Generic Access Profile (GAP) 434, and Generic Attribute Profile (GATT) 435.

The Logical Link Control and Adaptation Protocol (L2CAP) 437 provides one bilateral channel for transmitting data according to a specific protocol or with a specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode; and provides segmentation and reassembly, per-channel flow control, and error control.

The Service Discovery Protocol (SDP) 433 refers to the protocol used to search for a service (profile and protocol) that a Bluetooth service supports.

The BR/EDR protocols and profiles 432, 431 define a service employing the Bluetooth BR/EDR specification and an application protocol according to which exchange of data is performed.

The Attribute Protocol 436 relies on a server-client structure, which defines rules for the corresponding device to access data. Six message types are defined as shown below: Request message, Response message, Command message, Notification message, and Indication message.

Request message from client to server with Response message from server to client Command message from client to server without Response message Notification message from server to client without Confirm message Indication message from server to client with Confirm message from client to server The Generic Attribute Profile (GATT) 435 defines an attribute type.

The Generic Access Profile (GAP), 434 defines a method for discovering and connecting a device; and a method for providing information to a user. The GAP provides a privacy scheme.

As shown in FIG. 5, the BLE structure comprises a controller stack capable of processing a wireless device interface for which timing is critical and a host stack capable of processing high level data.

The controller stack may be called a controller, but in order to avoid being confused with the processor which is an internal element of a device described earlier in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 510, GATT based Profiles 520, Generic Attribute Profile (GATT) 530, Attribute Protocol (ATT) 540, Security Manager (SM) 550, and Logical Link Control and Adaptation Protocol (L2CAP) 560. The host stack is not limited to the aforementioned composition, but can include various protocols and profiles.

By using the L2CAP, the host stack multiplexes various protocols and profiles that Bluetooth specification provides.

First, the L2CAP 560 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 550 authenticates a device, which is a protocol for providing key distribution.

The Attribute Protocol (ATT) 540 relies on a server-client structure, which defines rules for the corresponding device to access data. Six message types are defined: Request, Response, Command, Notification, Indication, and Confirmation.

Request and Response message: Request message is used when a client device requests specific information from a server device, and Response message is used in response to the Request message, which is transmitted from the server device to the client device.

Command message: It is transmitted from the client device to the server device to indicate a command for specific operation, but the server device does not transmit a response to the Command message to the client device.

Notification message: The server device transmits this message to the client device to notify of an event, but the client device does not transmit a confirmation message with respect to the Notification message to the server.

Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

Servicer a combination of behaviors related to data. Defines basic operation of a device.

Include: defines a relationship between services.

Characteristics: a data value used by a service

Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.

Time: method for exchanging time information.

FindMe: provides an alarm service according to a distance.

Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 590, link layer 580, and host controller interface 570.

The physical layer (wireless transmission and reception module 590) transmits and receives a radio signal of 2.4 GHz; and uses Gaussian Frequency Shift Keying (GFSK) modulation and frequency hopping utilizing 40 RF channels.

The link layer 580 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening devices).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part:

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by sending a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by sending a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | PACKet Name |
|---|---|
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

In what follows, the connection procedure defined in the BLE technology will be described briefly and as one example of the connection procedure, a method for providing an object transmission service according to the BLE specification will be described.

Figure 6:
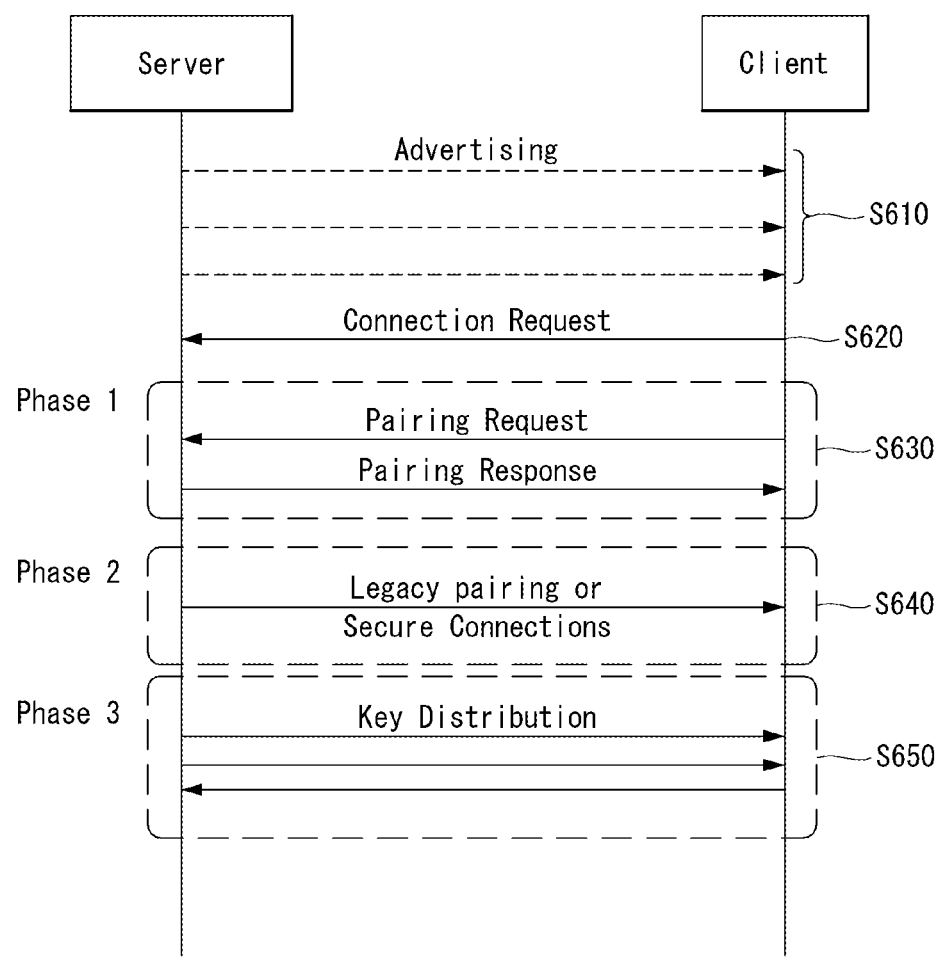
FIG. 6 is a flow diagram illustrating one example of a method for establishing a connection on the basis of Bluetooth low energy technology.

FIG. 6 is a flow diagram illustrating one example of a method for establishing a connection on the basis of Bluetooth low energy technology.

The server transmits an advertising message through three advertising channels S610.

The server before connection can be called an advertiser while it can be called a master after connection. An example of the server can be a sensor (such as a temperature sensor).

Similarly, the client before connection can be called a scanner while it can be called a slave after connection. An example of the client can be a smartphone.

As described above, Bluetooth devices perform communication by splitting 2.4 GHz band into a total of 40 channels. Three channels among the 40 channels are advertising channels and are used for exchange of packets including various types of advertising packets to establish a connection.

The remaining 37 channels are data channels and are used for exchange of data packets after a connection is established.

After receiving the advertising message, the client can transmit a scan request to the server to obtain additional data (for example, the name of a server device) from the server.

Then the server transmits to the client a scan response along with the remaining data in response to the scan request.

At this time, the scan request and the scan response are one type of an advertising packet which can include only user data comprising less than 31 bytes.

Therefore, if data comprise more than 31 bytes but are associated with a large overhead to send the data due to an established connection, the data are sent over two times by using the scan request and the scan response.

Next, the client transmits to the server a connection request for establishing a Bluetooth connection with the server S620.

Through the procedure above, a link layer connection between the server and the client is firmly established.

Afterwards, the server and the client perform a security establishment procedure.

The security establishment procedure can be interpreted as secure simple pairing or can be performed by including the secure simple pairing step.

In other words, the security establishment procedure can be performed through phase 1 to 3.

More specifically, a pairing procedure (phase 1) between the server and the client is performed S630.

In the pairing procedure, the client transmits a pairing request to the server, and the server transmits a pairing response to the client.

Next, in the phase 2, legacy pairing or secure connection is performed between the server and the client S640.

Next, in the phase 3, a key distribution procedure is performed between the server and the client S650.

Through the procedure above, a secure connection is established between the server and the client; and encrypted data can be transmitted and received.

Figure 7:
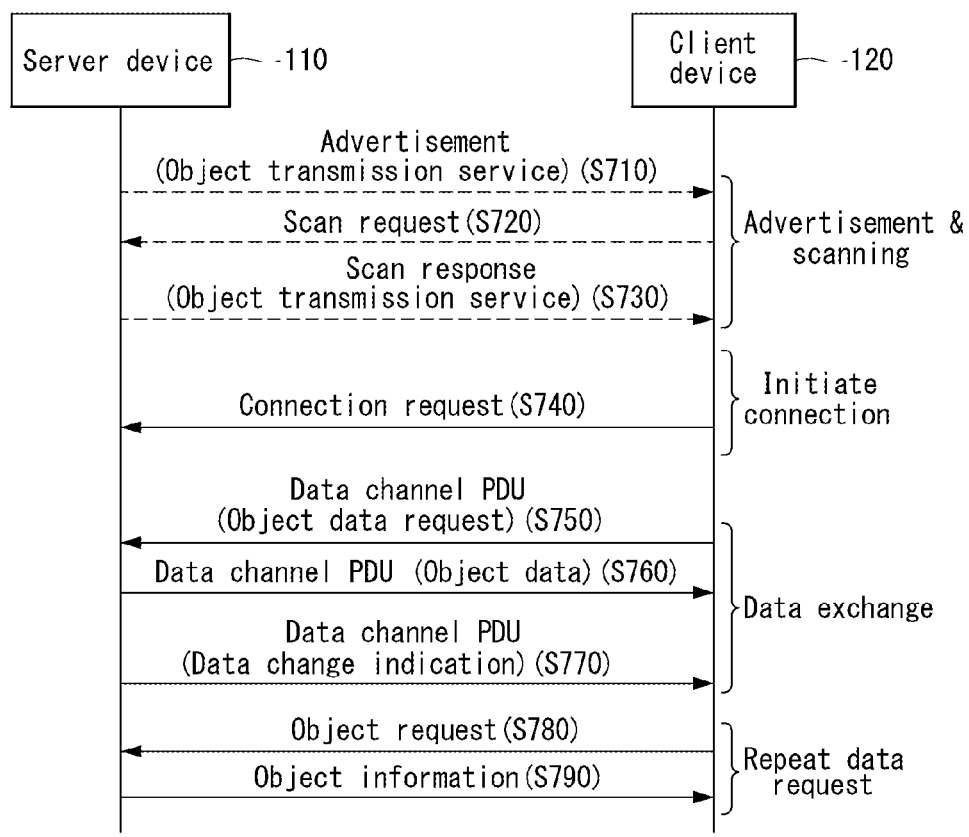
FIG. 7 is a flow diagram illustrating one example of a method for providing a service on the basis of Bluetooth low energy technology.

FIG. 7 is a flow diagram illustrating one example of a method for providing a specific service on the basis of Bluetooth low energy technology.

To establish a Bluetooth connection between a server device and a client device, the advertising procedure and the scanning procedure corresponding to S710 to S730 steps are performed.

First, the server device transmits an advertising message to the client device to notify of the information related to the service device including a specific service. S710.

The advertising message can be expressed in the form of an advertising PDU, advertising packet, advertisement, advertising frame, or advertising physical channel PDU.

The advertising message can include service information (including a service name) that the server device provides, the name of the server device, and manufacturer data.

Also, the advertising message can be transmitted to the client device according to a broadcast scheme or a unicast scheme.

Afterwards, the client device transmits to the server device a scan request message to obtain more specific information related to the server device S720.

The scan request message can be expressed in the form of a scanning PDU, scan request PDU, scan request, scan request frame, or scan request packet.

Afterwards, the server device transmits to the client device a scan response message in response to the scan request message received from the client device S730.

The scan response message includes server device-related information requested by the client device. At this time, the server device-related information can be the data that the server device can transmit with respect to provision of a specific service.

When the advertising procedure and the scanning procedure are terminated, the server device and the client device perform the initiating connection procedure and the data exchange procedure corresponding to S740 to S770 steps.

More specifically, the client device transmits to the server device a connect request message to establish a Bluetooth communication connection with the server device S740.

The connect request message can be expressed in the form of a connect request PDU, initiation PDU, connect request frame, or connect request.

A Bluetooth connection is established between the server device and the client device through S740 step, after which the server device and the client device can exchange data. During the data exchange procedure, data can be transmitted and received through the data channel PDU.

The client device transmits a data request to the server device through the data channel PDU S750. The data channel PDU can be expressed in the form of a data request message or data request frame.

Afterwards, the server device transmits the data that the client device has requested to the client device through the data channel PDU S760.

At this time, the data channel PDU is used to provide data to a corresponding device or request data from the corresponding device according to the scheme defined by the attribute protocol.

Afterwards, in case data change occurs in the server device, the server device transmits data changed indication information to the client device through the data channel PDU to notify of the data change S770.

Afterwards, the client device requests information related to the changed data from the server device to search for the changed data S780.

Afterwards, the server device transmits information related to the data changed in the server device to the client device in response to the request for the information related to the changed data S790.

Afterwards, the client device searches for the changed data by comparative analysis of the received information related to the changed data and the information related to the data currently carried by the client data.

However, the client device repeatedly performs the S780 and the S790 steps until the changed data are found.

Afterwards, if it is not needed to maintain a connected state between the host device and the client device, the host device or the client device can disconnect the corresponding connected state.

Figure 8:
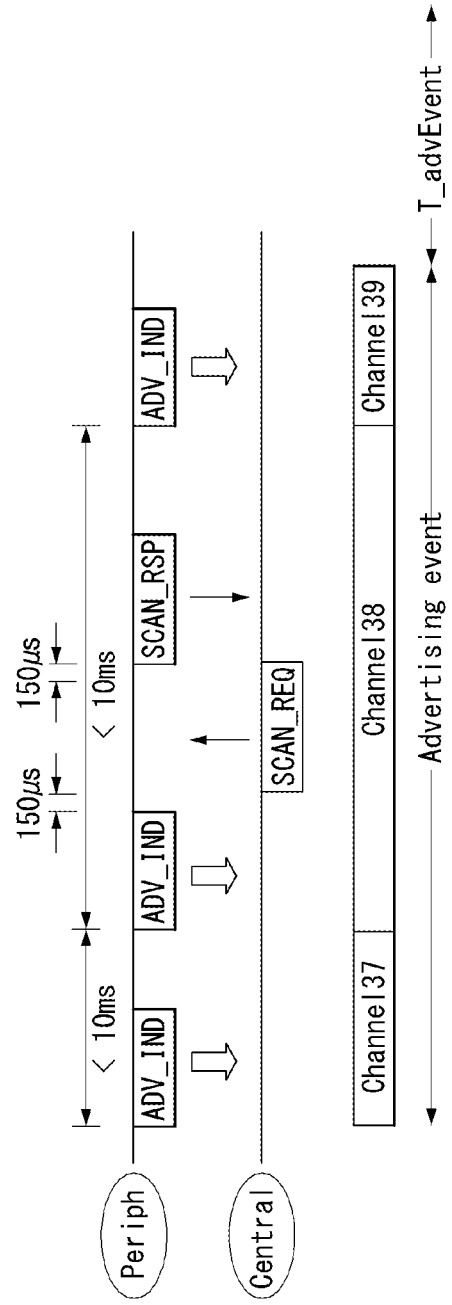
FIG. 8 illustrates one example of an advertising procedure of Bluetooth communication.

FIG. 8 illustrates one example of an advertising procedure of Bluetooth communication.

Devices can advertise (1) to broadcast arbitrary information, (2) to transmit signed data to a previously bonded device, (3) to advertise their presence to a device to which to connect, or (4) to perform reconnection asynchronously due to a local event.

With reference to FIG. 8, a peripheral device and a central device transmits and receives ADV_IND message, SCAN_REQ message, and SCAN_RSP message through three advertising channels (channel 37, 38, and 39).

At this time, the interval during which the peripheral and the central device transmit and receive the ADV_IND message, SCAN_REQ message, and SCAN_RSP message can be defined as an advertising event 810.

More specifically, the peripheral device transmits the ADV_IND message to the central device from channel 37, 38, and 39 respectively; the central device transmits the SCAN Request message to the peripheral device from channel 38; and the peripheral device transmits the SCAN Response message in response to the SCAN Request message from channel 38.

Figure 9:
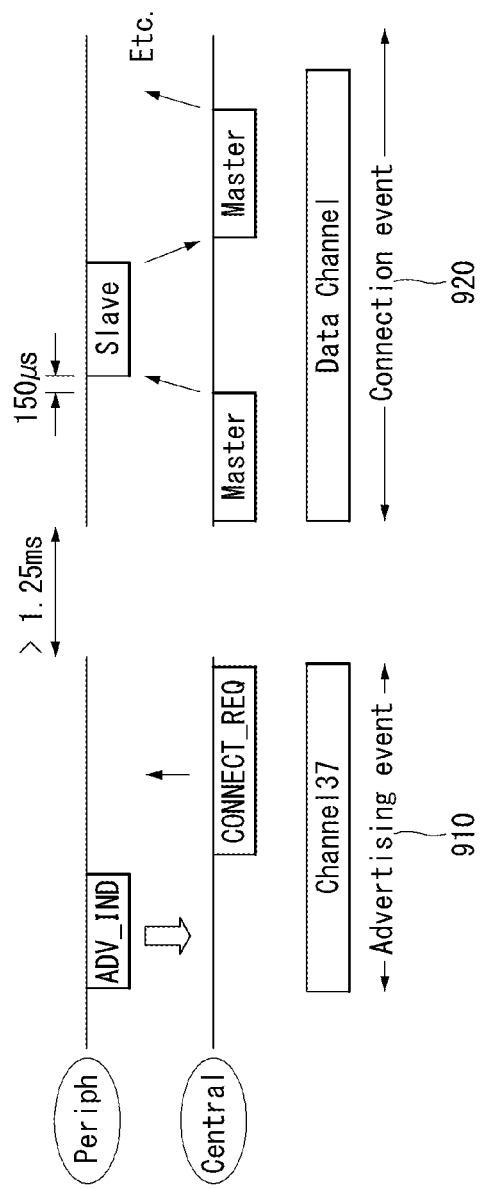
FIG. 9 illustrates one example of a data transaction procedure of Bluetooth communication.

FIG. 9 illustrates one example of a data transaction procedure of Bluetooth communication.

If a Bluetooth connection is established between devices (peripheral and central device), the master informs the slave of a hopping sequence and the time to wake up.

After a Bluetooth connection is established, the peripheral device can be called a slave, and the central device can be called a master.

All of the subsequent transactions are performed by 37 data channels.

Transactions are encrypted, and two devices can enter a deep sleep state between transactions.

With reference to FIG. 9, the central device establishes a Bluetooth connection with the peripheral device by transmitting the CONNECT_REQ message to the peripheral device through the channel 37.

By doing so, the advertisement event 910 is closed, and the connection event 920 is initiated.

In other words, the master and the slave transmit and receive data through (37) data channels.

Figure 10:
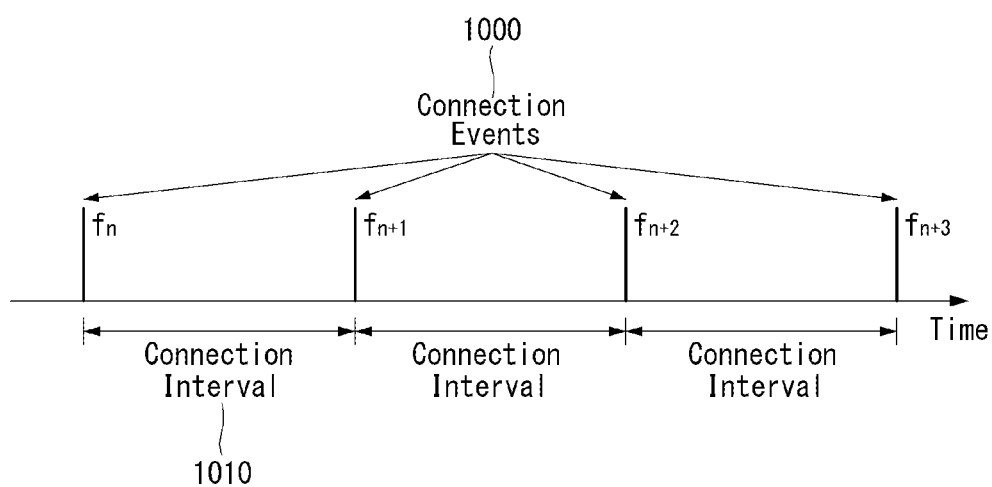
FIG. 10 illustrates one example of a connection event of Bluetooth communication.

FIG. 10 illustrates one example of a connection event of Bluetooth communication.

The connection event 1000 described in FIG. 9 can comprise a plurality of connection intervals 1010 or a plurality of connection events.

In other words, individual connection intervals use different channels from each other and can be defined as shown in Eq. 1.

$$f_{n+1} = (f_n + \text{hop}) \bmod 37, \quad [\text{Eq. 1}]$$

where $f_n$ represents the n-th hop frequency.

Figure 11:
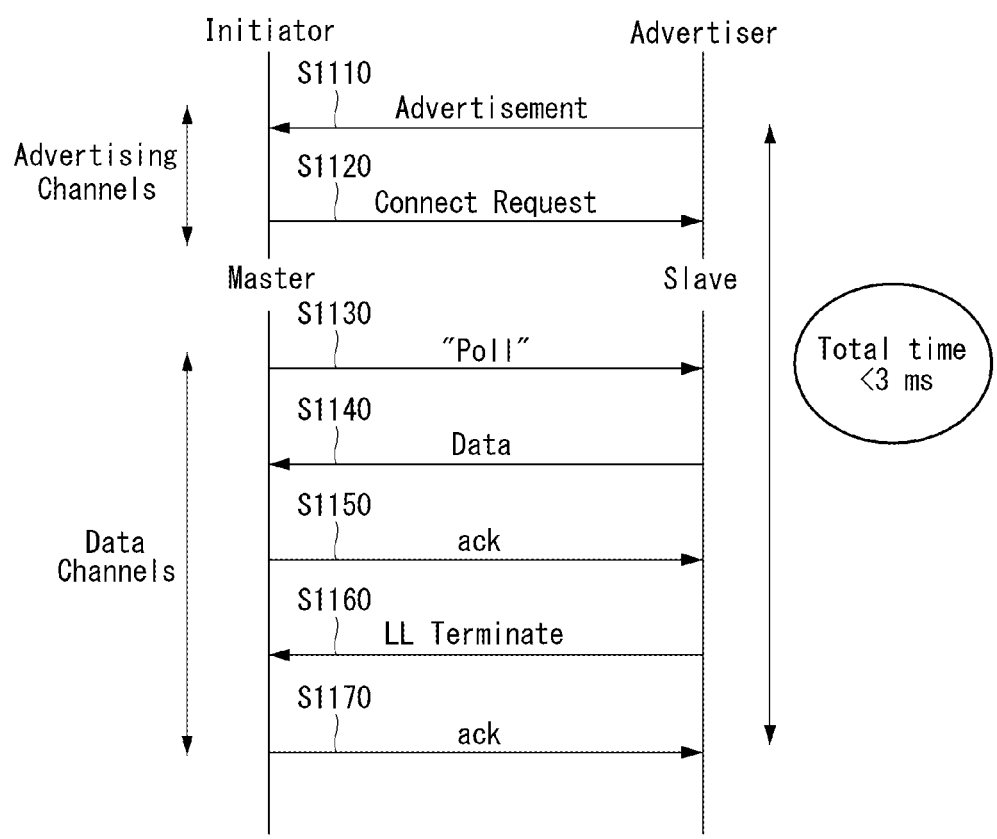
FIG. 11 illustrates one example of link layer connection of Bluetooth communication.

FIG. 11 illustrates one example of link layer connection of Bluetooth communication.

The link layer connection exhibits a very low latency.

With reference to FIG. 11, the advertiser transmits advertisement (message) to the initiator S1110.

Afterwards, the initiator transmits a connection request (message) to the advertiser S1120.

The S1110 and S1120 step are performed through three advertising channels.

When a Bluetooth connection is established between the initiator and the advertiser through the S1110 and S1120 step, the initiator can be called the master, and the advertiser can be called a slave.

Afterwards, the master transmits poll to the slave through a data channel S1130, and the slave transmits data to the master accordingly S1140.

Afterwards, the master transmits ACK to the slave S1150, and the slave transmits an LL Terminate (link layer termination) message to the master S1160.

Afterwards, the master transmits ACK with respect to the LL Terminate message to the salve S1170.

As shown in FIG. 11, the total time required to perform the S1110 to the S1170 step is less than about 3 ms.

Figure 12:
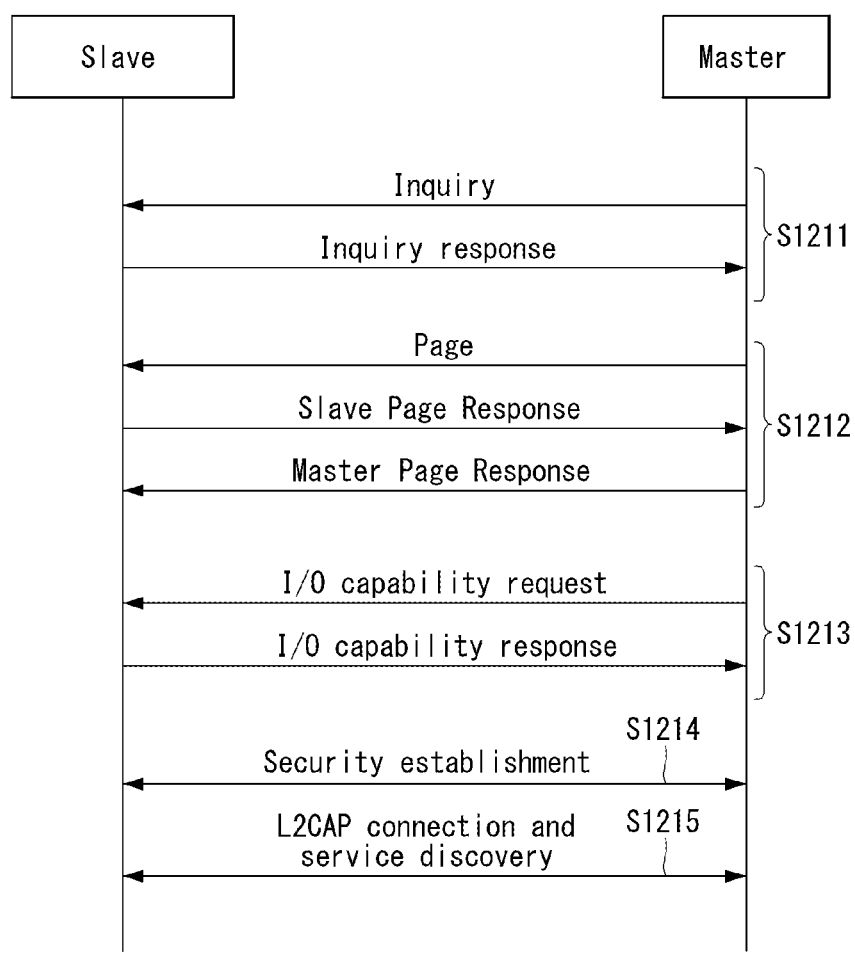
FIG. 12 is a flow diagram illustrating one example of a method for establishing a connection on the basis of Bluetooth BR/EDR technology.

FIG. 12 is a flow diagram illustrating one example of a method for establishing a connection on the basis of Bluetooth BR/EDR technology.

As shown in FIG. 12, the connection procedure defined in the Bluetooth BR/EDR specification can comprise the following steps.

The connection procedure can be regarded as a pairing procedure.

The Bluetooth pairing procedure comprises a standby state and a connected state only.

A device which has completed Bluetooth pairing becomes the connected state, and a device which has disconnected a connection operates in the standby state.

Also, Bluetooth devices, once connected to a specific device through the connection procedure, can subsequently perform a reconnection procedure to perform reconnection.

The reconnection procedure can use the same procedure as the connection procedure.

More specifically, the master device enters the standby mode by default when power is supplied.

Afterwards, the master device performs an inquiry procedure S1211 to discover devices in the surroundings thereof to establish a Bluetooth connection.

In other words, the master device can enter the inquiry state to discover a connectable device (slave) in its surroundings, and the slave device can enter an inquiry scan state to receive an ID packet that a nearby device (master) transmits in the inquiry state.

The master device staying in the inquiry state transmits an inquiry message by using an ID packet for once or at predetermined intervals to discover a connectable device in its surroundings.

The ID packet can be a General Inquiry Access Code (GIAC) or a Dedicated Inquiry Access Code (DIAC).

After receiving a GIAC or a DIAC, an ID packet that the master device has transmitted, the slave device transmits a Frequency Hopping Sequence (FHS) to perform Bluetooth pairing with the master device.

Also, depending on the needs, in case the slave device contains data to transmit, the slave device can transmit an extended inquiry response (in what follows, it is called an EIR) to the master device.

Once a connectable Bluetooth device is found in the vicinity through the inquiry procedure, the slave device performs a paging procedure S1212.

The paging procedure S1212 refers to the step where an actual connection is performed by synchronizing a hopping sequence on the basis of address and clock information after a nearby connectable Bluetooth device is found through the inquiry procedure.

More specifically, the paging procedure comprises (1) the master device's transmitting a page to the slave device, (2) the slave device's transmitting a slave page response to the master device, and (3) the master device's transmitting a master page response to the slave device.

When the inquiry procedure and the paging procedure are completed, the master and the slave device perform a security establishment step S1214 and subsequently perform an L2CAP connection and service discovery step S1215.

Before performing the security establishment step, the master and the slave device exchange Input/Output (I/O) capabilities S1213.

Exchange of I/O capabilities can be performed through an I/O capability request and an I/O capability response.

Also, the security establishment step may be interpreted to include or to be the same as a secure simple pairing procedure to be described later.

The Logical Link Control and Adaptation Protocol (L2CAP) is a packet-based protocol and exhibits characteristics similar to the UDP protocol. The L2CAP basically supports a maximum of 672 bytes of packet size but can handle a maximum of 65,535 bytes once communication is initiated.

After the L2CAP connection and service discovery step are performed, the master device can transmit data received from the user to the slave device S1216.

If the master and the slave device which have performed the connection procedure above do not perform data exchange for a predetermined time period, they enter a sleep mode to prevent power consumption and the corresponding connected state is terminated.

Afterwards, to transmit and receive data again, the master and the slave device perform the reconnection procedure.

The reconnection procedure can be performed through the same steps as the connection procedure.

Secure Simple Pairing (SSP)

Next, Secure Simple Pairing (SSP) will be described.

SSP can be largely described as comprising (a) I/O capabilities exchange, (2) public key exchange, phase 1, (3) authentication stage 1, phase 2, (4) authentication stage 2, phase 3, (5) link key calculation, phase 4, and (6) LMP authentication and encryption, phase 5.

The (2) to (6) steps can be further divided into a total of 13 steps.

Also, while the (2), (4), (5), and (6) step are the same for all protocols, the (3) step, namely the authentication stage 1 differs for each protocol since it depends on the protocol employed.

First, devices exchange I/O capabilities to determine an appropriate algorithm to be used for the authentication step.

At this time, the corresponding algorithm is called an association model and uses (1) numeric comparison, (2) Just Works, (3) out of band, and (4) passkey entry.

The Just Works can be included in the numeric comparison.

Therefore, the association model can be classified by (1) numeric comparison, (2) out of band, and (3) passkey entry.

Also, the authentication stage 1 can use a different procedure according to the association model.

First, according to the numeric comparison association model, both of two devices can deal with six-digit number and can be used in such a scenario where the user can input 'yes' or 'no'.

A good example of the numeric comparison association model is a telephone/PC scenario.

The user can see six-digit number (ranging from '000000' to '999999') on the displays of the two devices and is asked to check whether the numbers displayed on the two devices are the same. If the user enters 'yes' to the two devices, pairing between the two devices succeeds.

Next, the Just Works association model can be used in such a scenario where at least one of the devices cannot display a six-digit number and does not have a keyboard which supports inputting a six-digit number.

A good example of the Just Works association model is a cellular phone/mono headset scenario. Most of headsets do not have a display.

The Just Works association model uses the numeric comparison protocol. However, the user cannot see a particular number, but an application may simply recognize that the user has allowed a connection.

Next, the out of band association model can be mainly used in such a scenario where an out of band mechanism is used not only for a procedure of exchanging or transmitting password numbers used in the pairing procedure but also for a procedure of discovering devices.

To be effective in terms of security, an out of band channel has to provide different characteristics in view of security in comparison with Bluetooth radio channel. The out of band channel is required to be robust to Man-In-The-Middle (MITM) attack. Otherwise, security can be damaged during authentication procedure.

User experience may differ according to the out of band mechanism.

As one example, in an NFC solution, a user(s) first touches two devices together and is given an option by which the user can pair a first device with another device.

If 'yes' is input, pairing succeeds.

The exchanged information is one of touch experiences used for two devices.

The exchanged information includes not only password information but also discovery information (such as a Bluetooth device address). One of the devices uses a Bluetooth device address to establish a connection to other devices.

The remainder of the exchanged information is used during the authentication stage.

Next, the passkey entry association model can be used in such a scenario where one device has an input capability but is unable to display a six-digit number and the other device has a display capability.

A good example of the corresponding association model is a PC and keyboard scenario.

The user can see a six-digit number through a device equipped with a display. And the user can be asked to input a six-digit number through another device.

If the number input through another device matches, pairing succeeds.

Table 2 below shows association models applied according to a device property defined in the Bluetooth BR/EDR specification.

TABLE 2

| Device Property | Display Only | Display Yes/No | Keyboard Only | No Input No Output |
|---|---|---|---|---|
| Display Only | Numeric comparison with automatic confirmation on both devices, Unauthenticated | Numeric comparison with automatic confirmation on device B only, Unauthenticated | Passkey entry: Responder display, Initiator Input. - Authenticated | Numeric comparison with automatic confirmation on both devices - Unauthenticated |
| Display Yes/No | Numeric comparison with automatic confirmation on device A only, Unauthenticated | Numeric comparison: Both Display, Both Confirm - Authenticated | Passkey entry: Responder Display, Initiator Input - Authenticated | Numeric comparison with automatic confirmation on device A only - Unauthenticated |
| Keyboard Only | Passkey entry: Initiator display, responder input - Authenticated | Passkey entry: Initiator display, responder input - Authenticated | Passkey entry: Initiator and Responder input - Authenticated | Numeric comparison with automatic confirmation on both devices - Unauthenticated |

TABLE 2-continued

| Device Property | Display Only | Display Yes/No | Keyboard Only | No Input No Output |
|---|---|---|---|---|
| No Input No Output | Numeric comparison with automatic confirmation on both devices, unauthenticated | Numeric comparison with automatic confirmation on B device only, unauthenticated | Numeric comparison with automatic confirmation on both devices, unauthenticated | Numeric comparison with automatic confirmation on both devices, - unauthenticated |

With reference to Table 2, the numeric comparison association model is used in such a scenario where both of two devices are equipped with a display module that can show six-digit numbers and with an input device by which a user can choose 'yes' or 'no'; and provides an authenticated function.

Also, the numeric comparison association model can be used in such a case where at least one device is not equipped with a display model that can show a six-digit number or is not equipped with an input device by which a user can input a six-digit number.

However, in this case, the unauthenticated function is provided.

The passkey entry association model is used in such a scenario where either of two devices does not have a display device by which a six-digit number can be displayed but is equipped with an input device and the other device is equipped with a display device that can show a six-digit number; and provides the authenticated function.

Also, the passkey entry association model can be used in such a case where both of two devices are equipped with an input device and provides the authenticated function.

The out of band associated model can be used in such a scenario which utilizes the out of band mechanism (for example, NFC) which searches for a remote device and supports exchange of cryptographic numbers used in a pairing process.

Table 3 shows association models applied according to a device property defined in the Bluetooth BR/EDR specification.

TABLE 3

| Device Property | Display Only | Display Yes/No | Keyboard Only | No Input No Output | Keyboard Display |
|---|---|---|---|---|---|
| Display Only | Just Works, Unauthenticated | Just Works, Unauthenticated | Passkey entry - Authenticated | Just Works, Unauthenticated | Passkey entry - Authenticated |
| Display Yes/No | Just Works, Unauthenticated | Just Works, Unauthenticated | Passkey entry - Authenticated | Just Works, Unauthenticated | Passkey entry - Authenticated |
| Keyboard Only | Passkey entry - Authenticated | Passkey entry - Authenticated | Passkey entry - Authenticated | Just Works, Unauthenticated | Passkey entry - Authenticated |
| No Input No Output | Just Works, Unauthenticated | Just Works, Unauthenticated | Just Works, Unauthenticated | Just Works, Unauthenticated | Just Works, Unauthenticated |

TABLE 3-continued

| Device Property | Display Only | Display Yes/No | Keyboard Only | No Input No Output | Keyboard Display |
|---|---|---|---|---|---|
| Keyboard Display | Passkey entry - Authenticated | Passkey entry - Authenticated | Passkey entry - Authenticated | Just Works, Unauthenticated | Passkey entry - Authenticated |

With reference to Table 3, the Just Works association model is performed immediately without an additional input of the user and does not provide the authentication function.

Also, the passkey entry association model is used in such a case where either of two devices is not equipped with a display device capable of displaying a six-digit number but is equipped with an input device while the other device is equipped with a display device that can show a six digit number; and in such a case where both of two devices are equipped with an input device.

In this case, the authentication function is provided.

In what follows, described will be a method for providing a bilateral service between a first and a second device by providing a notification service from the first device (for example, a camera) to the second device (for example, a smart device) through Bluetooth communication according to the present invention.

In what follows, for the convenience of description, the first camera is assumed to be a camera, and the second device is assumed to be a smartphone or a remote device.

Figure 13:
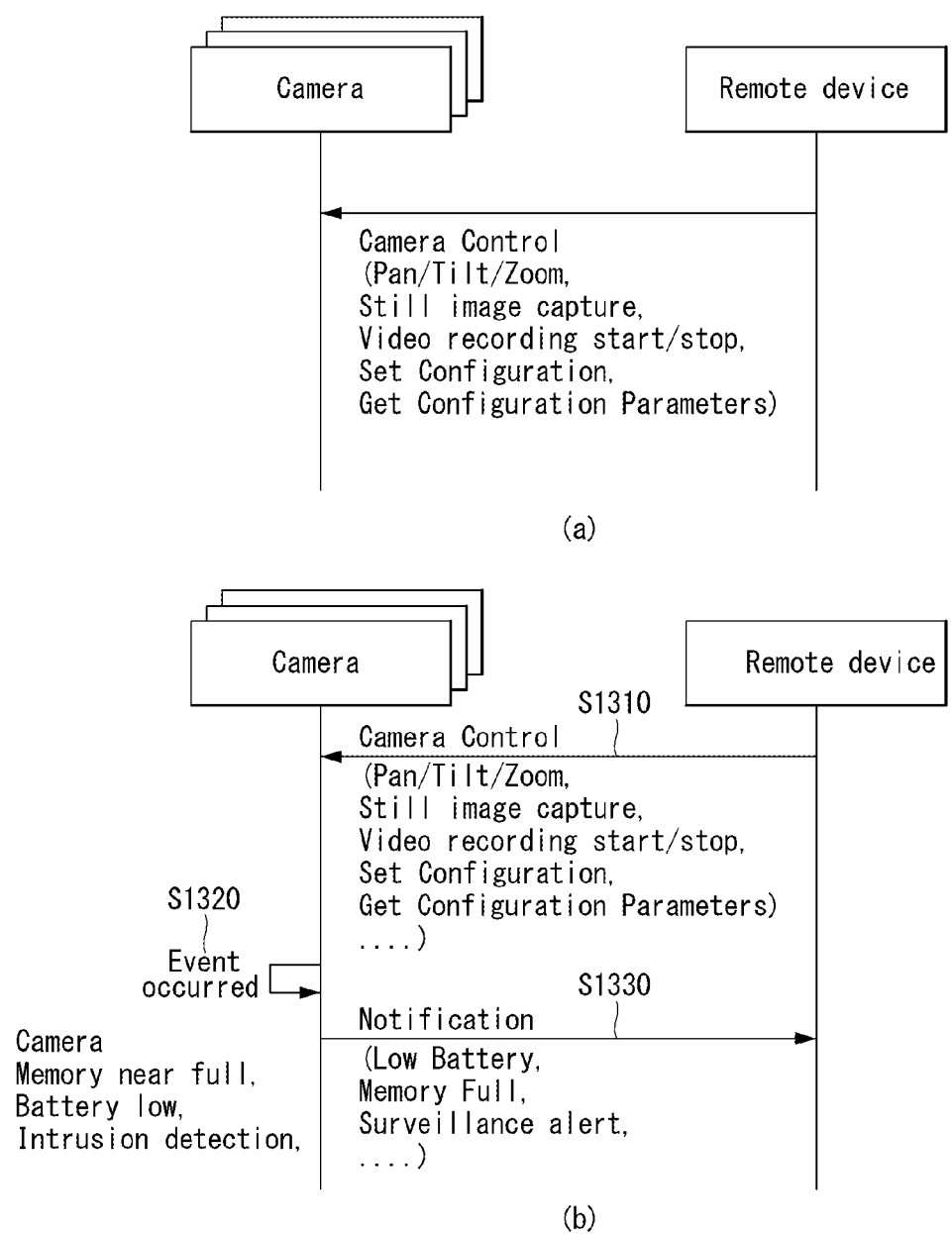
FIG. 13 illustrates one example of a method for performing bilateral control of devices by using Bluetooth communication according to the present invention.

FIG. 13 illustrates one example of a method for performing bilateral control of devices by using Bluetooth communication according to the present invention.

FIG. 13a illustrates one example of unilateral control of a camera according to the conventional Bluetooth technology, and FIG. 13b illustrates one example of bilateral control of a camera according to the Bluetooth technology according to the present invention.

At this time, bilateral control indicates that a remote device, namely a smartphone performs control of a camera and at the same time, the camera controls the smartphone.

As shown in FIG. 13a, the conventional Bluetooth technology supports only unilateral control of a camera.

In other words, only the remote device can transmit information related to camera control to the camera, but there is no other way for the camera to transmit information related to a control function to the remote device through Bluetooth communication.

At this time, information related to camera control includes pan, tilt, zoom, still image capture, video recording start/stop, set configuration, and get configuration parameters.

The pan denotes control of the camera's rotational motion in the horizontal plane, and tilt denotes control of the camera's rotational motion in the vertical plane.

Also, the camera can be a smart home surveillance camera, wearable camera, extreme sports camera, in-car camera, or living room camera such as the one installed in the TV.

Also, the remote device can be a gateway, smartphone, Bluetooth headset, or a control device without a User Interface (UI).

Also, it is assumed that the remote device can transmit and receive data to and from a storage device such as a cloud server through communication based on LAN, HTTP, or TCP/IP.

Contrary to the FIG. 13a, FIG. 13b illustrates a method for performing bilateral control, namely bilateral communication between a camera and a remote device by providing an additional notification message from the camera to the remote device.

In other words, the methods according to the present invention reinforce the aspect of the Internet of Things (IoT) enabling technology between devices by giving the camera an intelligence function.

With reference to FIG. 13b, the remote device transmits a camera control message for controlling at least one camera S1310.

The camera control message can include the camera control information described above.

Afterwards, if a particular event occurs at the at least one camera S1320, the at least one camera transmits a notification message to inform of the particular event to the remote device S1330.

The particular event may be memory near full, battery low, intrusion detection, or surveillance alert.

As shown in FIG. 13b, GATT based characteristics can be defined to support bilateral control (or bilateral communication) between at least one camera and a remote device.

Figure 14:
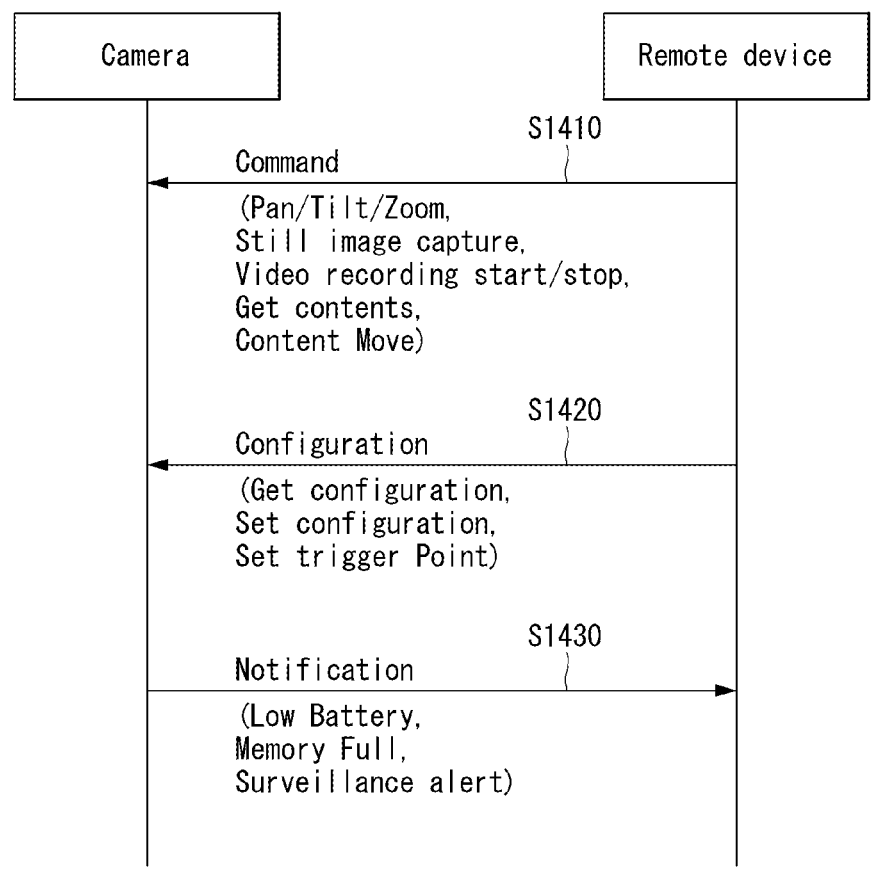
FIG. 14 is a flow diagram illustrating one example of a method for performing bilateral control of a camera according to the present invention.

In other words, FIG. 14 defines GATT based characteristics as shown in Table 4 and based on the definition, illustrates one example of a method for performing bilateral control of a camera and a remote device. Table 4 illustrates one example of GATT based characteristics.

In other words, Table 4 corresponds to one example of GATT based characteristics defined to perform bilateral control of a camera equipped additionally with an intelligence function according to the present invention.

TABLE 4

| Data Name | Descriptions | Data Range | Data Type |
|---|---|---|---|
| Optical zoom | Optical zoom range | N/A | TBD |
| Digital zoom | Digital zoom range | N/A | String |
| Capture mode | Video, photo, continuous capture, burst | N/A | String |
| Shooting mode | Night, day, macro, portrait, landscape, sport | N/A | TBD |
| Camera Effect | Capture filter-sepia, black/white, etc | N/A | Boolean |
| Resolution | Horizontal and vertical resolution | N/A | Unsigned Integer |
| Orientation | Right side up or upside down | N/A | Boolean |
| Compression type | Low, medium, high bit rate | N/A | String |
| Pan/Tilt | Pan and tilt parameters | N/A | Bitfield |
| Field of View | Camera FOV (wide, standard, narrow, etc.) | N/A | Boolean |
| Capture Start/stop | Start capture, stop capture | N/A | Unsigned Integer |
| Picture per second | picture to capture per second | N/A | String |
| Camera on/off | turn camera on/off | N/A | String |
| Get Contents | Command for requesting the contents from remote device. (contents type, cam no, . . .) | N/A | String |
| Content Move | Command for content move via predefined Wi-Fi information. | N/A | Bit field |
| Memory Alarm Threshold | threshold value that is used for memory near full notification | 0~100% | Integer |
| Surveillance Mode | camera support surveillance feature (including video analysis) | On/Off | Boolean |

TABLE 4-continued

| Data Name | Descriptions | Data Range | Data Type |
|---|---|---|---|
| Auto Contents Move | if the contents storage in camera reach to specified value, then contents in camera automatically transfer to remote device via Wi-Fi. | On/Off | Boolean |
| Auto Contents Move Threshold | Threshold value that is used for automatic contents transport to remote device. (defaultValue: 70%) | 0~100% | Integer |
| Camera Notification | some event notification from camera to remote device (memory near full, need battery change, security alert, . . .) | On/Off | Boolean |
| Support Wi-Fi | Wi-Fi capability support in camera | On/Off | Boolean |
| Wi-Fi info | Wi-Fi connection information | N/A | String |
| Group Camera Handling | group cameras handling by one action on remote device | On/Off | Boolean |

FIG. 14 is a flow diagram illustrating one example of a method for performing bilateral control of a camera according to the present invention.

In FIG. 14, the camera can operate as a GAP peripheral and a GATT server; and the remote device can operate as a GAP central and a GATT client.

With reference to FIG. 14, the remote device transmits a command message to the camera S1410.

At this time, as an example, the remote device is assumed to be a smartphone.

The command message can include data of Table 4 above.

In other words, the command message can be the information commanding pan/tilt/zoom, still image capture, video recording start/stop, acquisition of contents, or movement of contents.

Also, the remote device transmits a configuration message to the camera S1420.

The configuration message can be transmitted to obtain camera configuration, to set camera configuration, or to set a trigger point by which information can be transmitted to the remote device from the camera.

Afterwards, if the camera satisfies the set trigger point (or a particular event occurs), the camera transmits a notification message to the remote device S1430.

The notification message can include information related to the trigger point or information related to the particular event occurred.

Next, specific embodiments applying the method for performing bilateral control of a camera described with reference to FIGS. 13 and 14 to various scenarios will be described in more detail with reference to related drawings.

Figure 15:
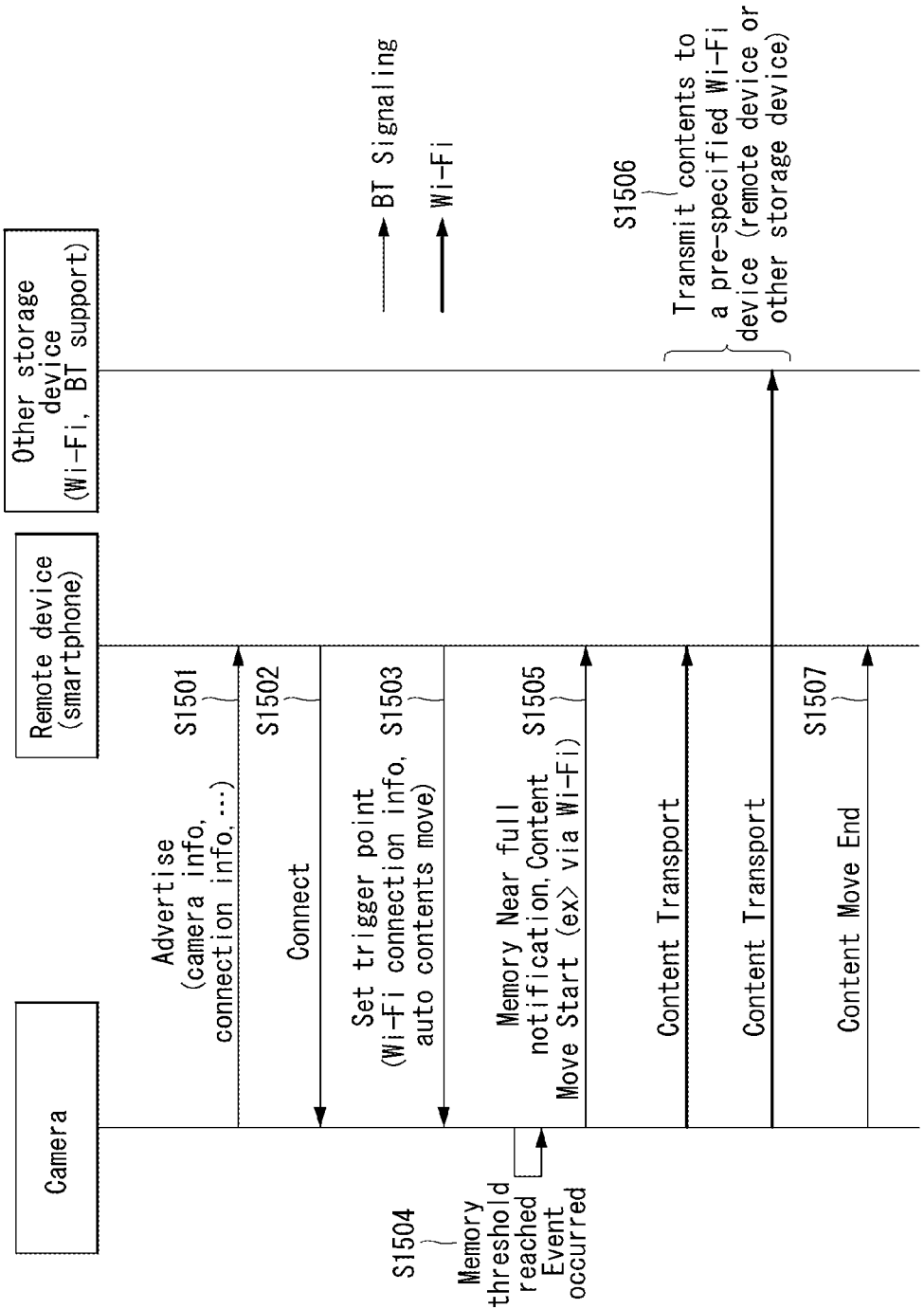
FIG. 15 is a flow diagram illustrating one example of a bilateral control method between a camera and a remote device by using Bluetooth communication according to the present invention.

FIG. 15 is a flow diagram illustrating one example of a bilateral control method between a camera and a remote device by using Bluetooth communication according to the present invention.

In particular, FIG. 15 illustrates one example of a bilateral control method of a wearable camera.

In other words, FIG. 15 illustrates a method for transmitting life logging images recorded by a wearable camera attached to a user's clothes to a smartphone or a designated device within home (for example, a server) by using Bluetooth communication.

With reference to FIG. 15, the (wearable) camera transmits an advertising message to the remote device (for example, a smartphone) S1501.

The advertising message is transmitted through three advertising channels.

The advertising message can include information related to the camera and connection information.

Afterwards, the remote device transmits a connect request message to the camera S1502.

By doing so, the remote camera and the camera are configured to establish a Bluetooth connection.

Afterwards, the remote device transmits a set trigger point to the camera S1503.

The set trigger point is intended to provide a condition (or a particular event) by which the camera can transmit feedback or notification information to the remote device.

Also the set trigger point can represent a condition by which specific information can be received from the camera.

The set trigger point can include Wi-Fi connection information of the remote device and information related to auto contents move.

At this time, auto contents move can indicate that contents are moved or transmitted from the camera to the remote device in case a particular trigger point is reached.

In case a particular event occurs at the camera S1504, the camera transmits a notification message to notify of the particular event to the remote device S1505.

In the case of FIG. 15, the particular event can indicate that the memory of the camera has reached a threshold value.

At this time, the notification message can include information indicating through which communication (for example, Wi-Fi) to perform contents movement or transmission.

Afterwards, the camera transmits contents stored in the camera to the remote device or to a particular device (for example, a storage device or a server) through communication specified in the notification message of the S1505 step S1506.

The particular device can be a specific device within home. Also, the particular device can perform a communication function specified in the notification message.

If contents are transmitted to the particular device, the remote device can transmit beforehand the information notifying that contents are transmitted from the camera to the particular device.

In case movement of contents to the remote device or to the particular device is completed, the camera transmits a content move end message for notifying of completion of contents movement to the remote device S1507.

Figure 16:
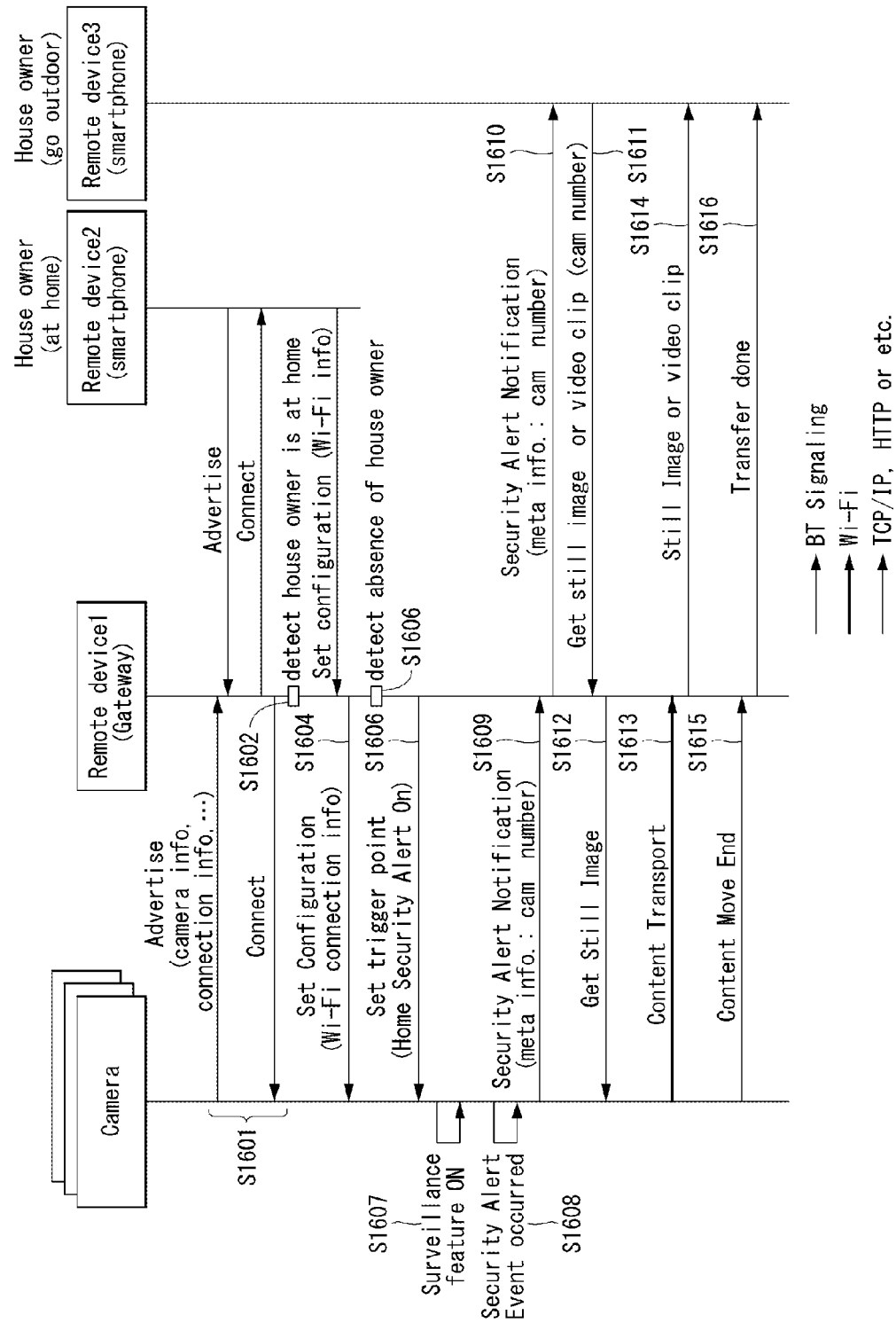
FIG. 16 is a flow diagram illustrating another example of a bilateral control method between a camera and a remote device by using Bluetooth communication according to the present invention.

FIG. 16 is a flow diagram illustrating another example of a bilateral control method between a camera and a remote device by using Bluetooth communication according to the present invention.

In particular, FIG. 16 illustrates one example of a method for controlling a surveillance camera within smart home through a Bluetooth communication.

In other words, FIG. 16 illustrates a scenario where a plurality of security cameras are installed within smart home; if a remote device (for example, a smartphone) gets out of the smart home, the security cameras automatically enter a security mode; and when intrusion is detected or a problem occurs within the smart home, alert information is transmitted to the user or to the smartphone.

With reference to FIG. 16, the remote device 1 performs a Bluetooth connection procedure with a plurality of cameras and the remote device 2 S1601.

The remote device 1 can be a gateway within smart home, and the remote device 2 can be a smartphone.

As described above, the Bluetooth connection procedure is performed through transmission/reception of an advertising message and the steps of transmitting/receiving a connection request message.

FIG. 16 assumes a situation where the remote device 2 is located within smart home and moves to the outside leaving the smart home.

The remote device 1 detects that the remote device 2 is located within the smart home S1602.

The remote device 2 transmits a set configuration message including Wi-Fi connection information to the remote device 1 S1603.

Afterwards, the remote device 1 forwards the set configuration message received from the S1603 step to a plurality of cameras S1604.

At this time, the remote device 1 can transmit and receive data to and from the plurality of cameras by using two different methods.

A first method maintains all of the connections to a plurality of cameras; and a second method opens a connection to a camera only when data transmission and reception is required and closes a connection otherwise.

In other words, in the case of the second method, the remote device 1 transmits and receives data by establishing a Bluetooth connection with a particular camera and if there is no more data to transmit or receive, the corresponding Bluetooth connection is closed.

In the case of the first method, the remote device 1 can periodically transmit to a plurality of cameras an empty packet by which whether the corresponding Bluetooth connection is active can be checked.

Afterwards, if the remote device 1 detects that the remote device 2 is not found within smart home (namely if the remote device 1 detects that the remote device 2 is located outside the smart home) S1605, the remote device 1 transmits a set trigger point to the plurality of cameras S1606.

The set trigger point represents a condition by which a plurality of cameras provide feedback to the remote device 1; in the case of FIG. 16, the set trigger point includes Home Security Alert On information which indicates turning on of a home security alert system.

In other words, in case the plurality of cameras receives the set trigger point, the plurality of cameras turns on the security alert function S1607.

Afterwards, in case an event related to the security alert occurs S1608, the plurality of cameras transmits a security alert notification message to the remote device 1 S1609.

The security alert notification message includes meta-data such as the information representing the number of a camera which has caused the security alert.

Afterwards, if the remote device 2 is located within smart home, the remote device 1 forwards or transmits a security alert notification message to the remote device 2 by using communication (TCP/IP, HTTP, and the like) different from the communication used to connect to the remote device 2 S1610.

Afterwards, the remote device 2 transmits an image capture message for obtaining a still image or a video clip at the time of occurrence of a security alert to the remote device 1 S1611.

At this time, the image capture message can include information related to the number of a camera which has to capture a still image or to record a video clip.

Afterwards, the remote device 1 transmits the image capture message to the plurality of cameras S1612.

Afterwards, at least one camera corresponding to the camera number within the received image capture message among the plurality of cameras transmits contents (still images, video clip, and so on) requested from the remote device 1 S1613.

Communication used for transmission of the contents can use a pre-defined communication technology.

In the case of FIG. 16, the corresponding contents are transmitted through Wi-Fi.

Afterwards, the remote device 1 forwards the contents received from the camera to the remote device 2 S1614.

Afterwards, if movement of contents is ended, the at least one camera transmits the content move end message to the remote device 1 to notify of the end of content movement S1615.

The remote device 1 transmit or forward the content move end message to the remote device 2 S1616.

The S1609 to S1616 steps correspond to the operations performed when the remote device 2 is located outside the smart home.

Figure 17:
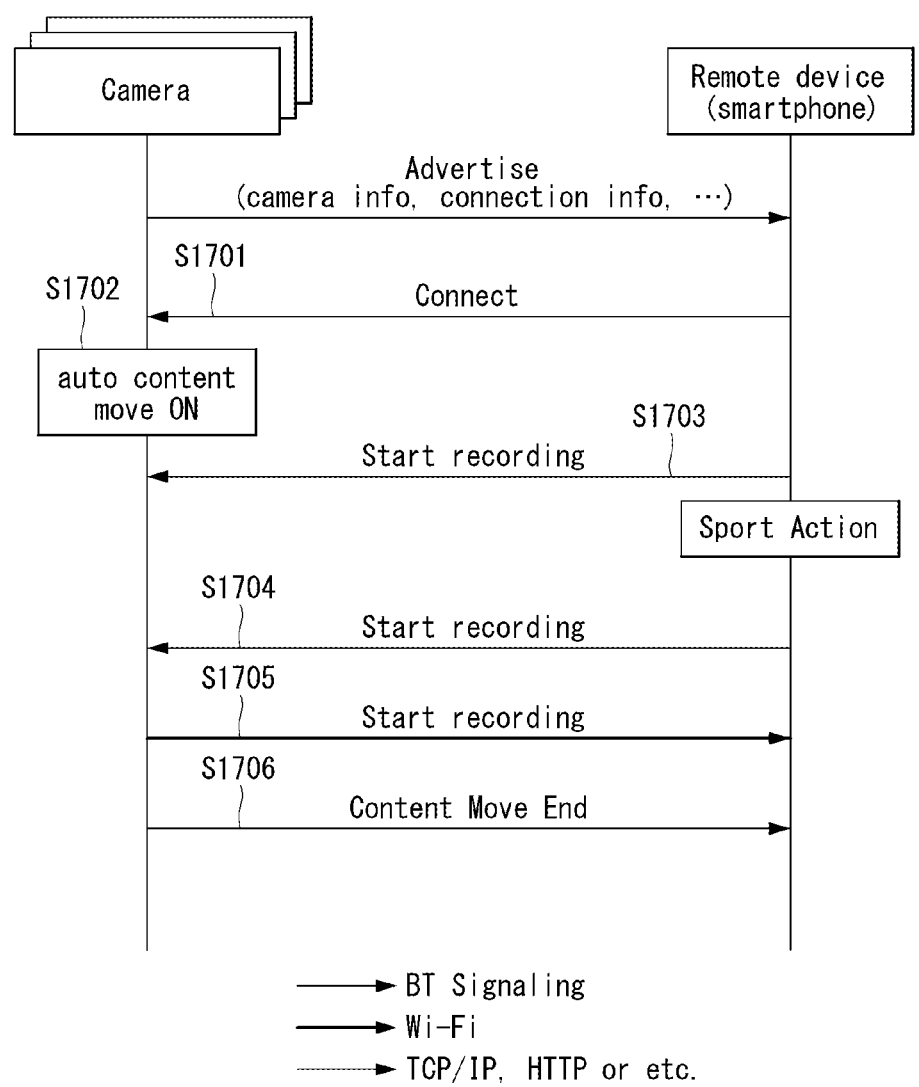
FIG. 17 is a flow diagram illustrating a yet another example of a bilateral control method between a camera and a remote device by using Bluetooth communication according to the present invention.

FIG. 17 is a flow diagram illustrating a yet another example of a bilateral control method between a camera and a remote device by using Bluetooth communication according to the present invention.

In particular, FIG. 17 illustrates one example of a direct camera control method for extreme sport.

FIG. 17 assumes a situation that several extreme sport cameras are installed at appropriate positions, record a sports action for two to three seconds, and transmit the corresponding video clip to a specified device.

In other words, FIG. 17 illustrates a method for a sport actor with a smartphone to control turning on or off the recording function of the extreme sport camera before and after a sports action by using the corresponding smartphone.

With reference to FIG. 17, one or more cameras perform a Bluetooth connection procedure with a remote device (for example, a smartphone) S1701.

In other words, one or more cameras transmit an advertising message to the remote device, and the remote device transmits a connection request message to the one or more cameras.

At this time, as described above, the Bluetooth connection established by the one or more cameras to the remote device can be performed in two ways: (1) the remote device maintains all of the Bluetooth connections to the one or more cameras or (2) the remote device opens a connection to a camera only when data transmission and reception is present but closes a connection otherwise.

First, in the case of the method (1), the remote device continuously opens Bluetooth connections to the one or more cameras and periodically transmits to the one or more cameras an empty packet by which whether the corresponding Bluetooth connection is active can be checked.

Also, in the case of the method (2), since the time required to establish a Bluetooth connection is very short (less than 3 ms), it is advantageous in view of resource consumption to perform a connection ending procedure if data transmission/reception is terminated after the connection.

Therefore, the remote device can open a connection with one or more cameras, close the connection if data transmission and reception is terminated, and if additional data transmission and reception occurs, perform a reconnection procedure.

At this time, the remote device can establish multiple Bluetooth connections simultaneously with a plurality of cameras and transmit and receive data to and from the cameras. This is possible because up to 37 data channels are available and the remote device can transmit and receive data to and from the respective cameras by using different data channels.

After the S1701 step, the one or more cameras turns on the auto content move function which automatically moves contents S1702.

Afterwards, the remote device transmits a video recording start message which commands the one or more cameras to start video recording S1703.

Afterwards, the remote device transmits a video recording stop message which commands the one or more cameras to stop video recording S1704.

If receiving the video recording stop message, the one or more cameras transmit a recorded video to the remote device S1705.

Transmission of the recorded video can use Wi-Fi communication as shown in FIG. 17.

Afterwards, if transmission of the recorded video is completed, the one or more cameras notify the remote device of completion of transmission of the recorded video S1706.

Figure 18:
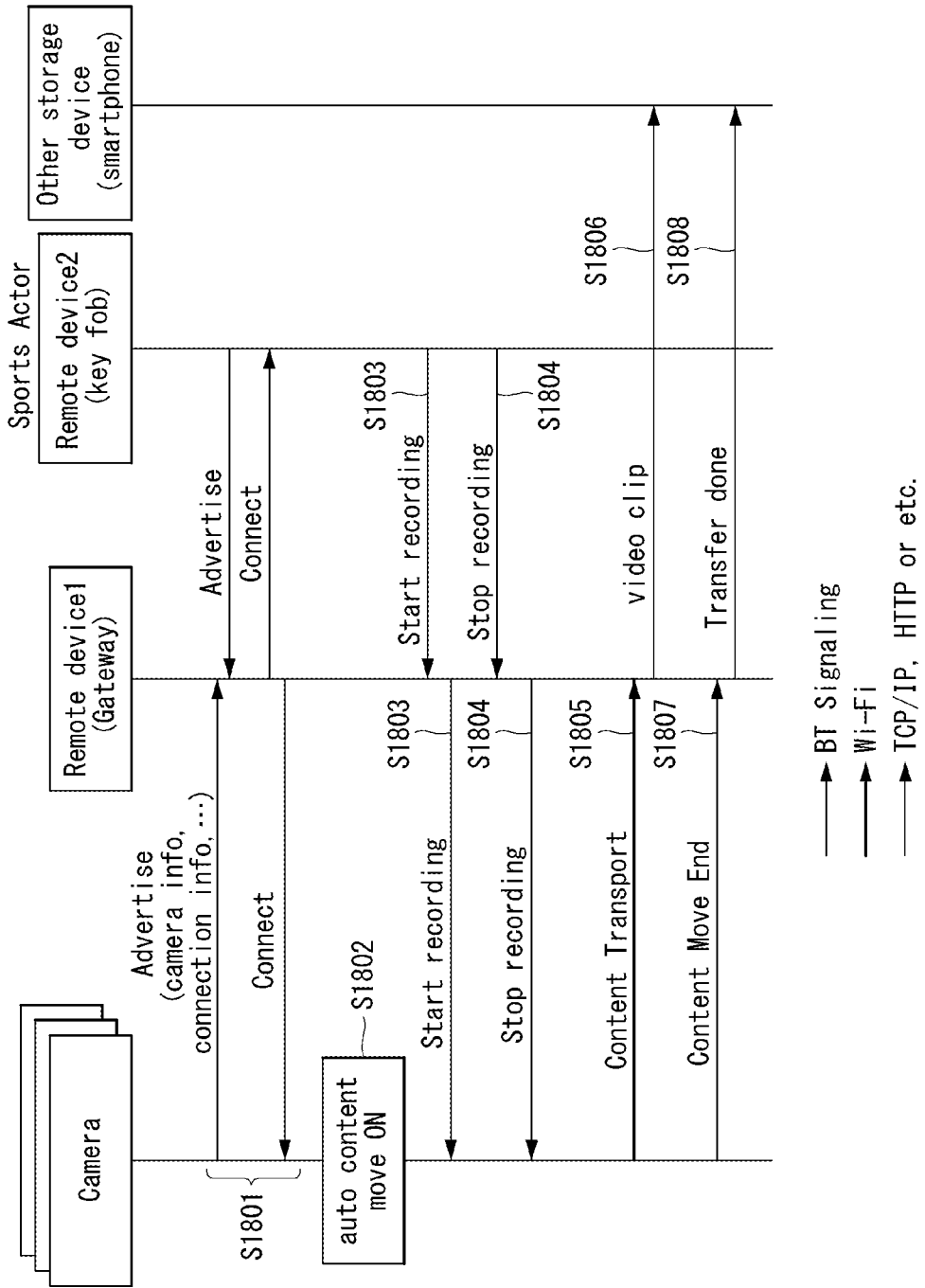
FIG. 18 is a flow diagram illustrating a still another example of a bilateral control method between a camera and a remote device by using Bluetooth communication according to the present invention.

FIG. 18 is a flow diagram illustrating a still another example of a bilateral control method between a camera and a remote device by using Bluetooth communication according to the present invention.

FIG. 18 illustrates one example of a direct camera control method for extreme sport utilizing a gateway.

FIG. 18 assumes a situation that several extreme sport cameras are installed at appropriate positions, record a sports action for two to three seconds, and transmit the corresponding video clip to a specified device.

FIG. 18 illustrates a method for a sports actor holding a key fob to perform automatic connection between devices and automatic recording when performing a sports action (trick, ski jump, and so on); and to transmit a recorded video to a specified (storage) device when the sports action is completed.

In FIG. 18, the gateway can be called a remote device 1, the key fob a remote device 2, a remote device 3 a storage device providing a storage function such as a smartphone.

In other words, FIG. 18 illustrates a method for transmitting a recorded video from at least one camera to a smartphone through the gateway; and illustrates one example where the device performing recording start and stop and the device receiving a recorded video are different.

In other words, FIG. 18 illustrates a method by which a key fob performs camera control and particular contents are transmitted from the camera to the remote device 3 rather than the key fob.

With reference to FIG. 18, the remote device 1 performs a Bluetooth connection procedure with a plurality of cameras and the remote device 2 S1801.

Afterwards, the plurality of cameras turn on the auto content move function S1802.

When a set trigger point is received, the auto content move function of the plurality of cameras can be activated.

Next, the remote device 2 forwards a recording start message which commands recording start to the remote device 1, and the remote device 1 forwards the recording start message to the plurality of cameras S1803.

In the same way as the recording start procedure, to stop recording, the remote device 2 forwards a recording stop message which requests or commands to stop recording to the remote device 1, and the remote device 1 forwards the recording stop message to the plurality of cameras S1804.

Afterwards, the plurality of cameras transmits contents (recorded video) to the remote device 1 S1805.

Transmission of the contents can be performed through Wi-Fi communication.

Afterwards, the remote device 1 transmits the received contents (for example, video clip) to the remote device 3 S1806.

The remote device 1 and the remote device 3 can transmit and receive data through TCP/IP, HPPT, and the like.

Afterwards, when transmission of contents is completed, the plurality of cameras transmit a content transmission end message (for example, transfer done) to the remote device 1 to notify of completion of transmission of contents S1807, and the remote device 1 forwards or transmits the content transmission end message to the remote device 3 S1808.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

A method for transmitting and receiving data by using an isochronous channel according to the present invention is not limited to the embodiments described above, but the entire embodiments can be combined or part of the embodiments can be combined selectively so that various modifications can be made to the embodiments.

Meanwhile, a method for transmitting and receiving data by using an isochronous channel according to the present invention can be implemented in the form of processor-readable program codes in a recording medium that can be read by a processor installed in a network device. The processor readable recording medium includes all kinds of recording devices storing data that can be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium can be distributed across computer systems connected to each other through a network, and program codes that can be read by the processor can be stored and run in a distributed manner.

Throughout the document, preferred embodiments of the present invention have been described with referenced to appended drawings; however, the present invention is not limited to the embodiments above. Rather, it should be noted that various modifications of the present invention is made by those skilled in the art to which the present invention belongs without leaving the technical scope of the present invention defined by the appended claims, and these modifications should not be understood individually from the technical principles or aspects of the present invention.

This document describes both of the product invention and process invention, and depending on the needs, descriptions of both inventions can be applied in a complementary manner.

The present invention provides a method for controlling a device by using Bluetooth communication.

What is claimed is:

1. A method for controlling a camera by using Bluetooth communication in a wireless communication system, the method performed by a first device, the method comprising:
   receiving an advertising message from the camera,
     wherein the advertising message includes at least one of the camera-related information or connection information related to the camera connection;

transmitting a connection request message for establishing a Bluetooth connection to the camera;

transmitting to the camera a command message including camera control information for controlling a specific function of the camera through the Bluetooth communication, wherein the command message includes an automatic content move command for instructing to automatically move the content of the camera and a Wi-Fi connection information used for the automatic content move;

receiving from the camera a contents move start message indicating start of movement of contents of the camera through the Bluetooth communication;

establishing a Wi-Fi connection with the camera based on the Wi-Fi connection information;

receiving contents of the camera from the camera through the Wi-Fi communication;

transmitting to the camera a configuration message for setting a trigger point of the camera through the Bluetooth communication, wherein the trigger point is a condition by which specific information can be received from the camera and the trigger point includes a memory alarm threshold representing a threshold value indicating that the camera memory is near full; and receiving a notification message including the specific information from the camera through the Bluetooth communication.

2. The method of claim 1, further comprising receiving from the camera a contents move end message indicating end of movement of contents of the camera.

3. The method of claim 1, wherein the camera control information includes surveillance mode information representing a surveillance feature supported by the camera.

4. The method of claim 1, wherein the specific information further comprises security alert notification information, and the security alert notification information includes camera number information corresponding to a camera which has caused a security alert.

5. The method of claim 4, further comprising
forwarding the specific information to a second device;
receiving from the second device an image capture message commanding a camera corresponding to the camera number information to capture an image related to a security alert notification;
forwarding the received image capture message to a camera corresponding to the camera number information;
receiving an image from the camera corresponding to the camera number information; and
transmitting the received image to the second device.

6. The method of claim 1, wherein the camera refers to a plurality of cameras, and the method further comprises establishing a Bluetooth connection to the plurality of cameras simultaneously; and transmitting an empty packet to each camera to check the Bluetooth connection.

7. The method of claim 6, further comprising transmitting and receiving data to and from the plurality of cameras respectively by using different data channels simultaneously.

8. A first device for controlling a camera by using Bluetooth communication in a wireless communication system, the first device, comprising:
a communication unit; and
a processor functionally connected to the communication unit,
wherein the processor is configured to:
control the communication unit to receive an advertising message from the camera, wherein the advertising message includes at least one of the camera-related information or connection information related to the camera connection,
control the communication unit to transmit a connection request message for establishing a Bluetooth connection to the camera,
control the communication unit to transmit to the camera a command message including camera control information for controlling a specific function of the camera through the Bluetooth communication,
wherein the command message includes an automatic content move command for instructing to automatically move the content of the camera and a Wi-Fi connection information used for the automatic content move;
control the communication unit to receive from the camera a contents move start message indicating start of movement of contents of the camera through the Bluetooth communication,
establish a Wi-Fi connection with the camera based on the Wi-Fi connection information,
control the communication unit to receive contents of the camera from the camera through the Wi-Fi communication,
control the communication unit to transmit to the camera a configuration message for setting a trigger point of the camera through the Bluetooth communication, where the trigger point is a condition by which specific information is received from the camera and the trigger point includes a memory alarm threshold representing a threshold value indicating that the camera memory is near full, and
control the communication unit to receive a notification message including the specific information from the camera through the Bluetooth communication.

* * * * *